(12) United States Patent
Migita et al.

(10) Patent No.: US 8,743,475 B2
(45) Date of Patent: Jun. 3, 2014

(54) LENS BARREL AND PROJECTOR

(75) Inventors: Yasutake Migita, Nishinomiya (JP); Takahiro Tatsumi, Osaka (JP)

(73) Assignee: Konica Minolta Advanced Layers, Inc. (JP)

( * ) Notice: Subject to any disclaimer, the term of this patent is extended or adjusted under 35 U.S.C. 154(b) by 29 days.

(21) Appl. No.: 13/487,624

(22) Filed: Jun. 4, 2012

(65) Prior Publication Data

US 2012/0314114 A1   Dec. 13, 2012

(30) Foreign Application Priority Data

Jun. 10, 2011   (JP) .................................. 2011-129989

(51) Int. Cl.
 *G02B 15/14* (2006.01)
(52) U.S. Cl.
 USPC ............................................................ 359/700
(58) Field of Classification Search
 USPC ................................................ 359/694–704
 See application file for complete search history.

(56) References Cited

U.S. PATENT DOCUMENTS

2011/0194198 A1*   8/2011   Iida ............................... 359/817

FOREIGN PATENT DOCUMENTS

JP   2009-251315 A   10/2009

* cited by examiner

*Primary Examiner* — James Jones
(74) *Attorney, Agent, or Firm* — Cantor Colburn LLP

(57) ABSTRACT

A lens barrel and a projector of the invention are provided with a fixed cylinder, and a cam ring mounted on the fixed cylinder. A first projection and a second projection are provided on one of the fixed cylinder and the cam ring, and a first rotation restricting portion and a second rotation restricting portion are provided on the other of the fixed cylinder and the cam ring. The first rotation restricting portion restricts rotation of the cam ring by abutting contact with the first projection when the cam ring is rotated in a first direction, and the second rotation restricting portion restricts rotation of the cam ring by abutting contact with the second projection when the cam ring is rotated in a second direction opposite to the first direction.

21 Claims, 19 Drawing Sheets

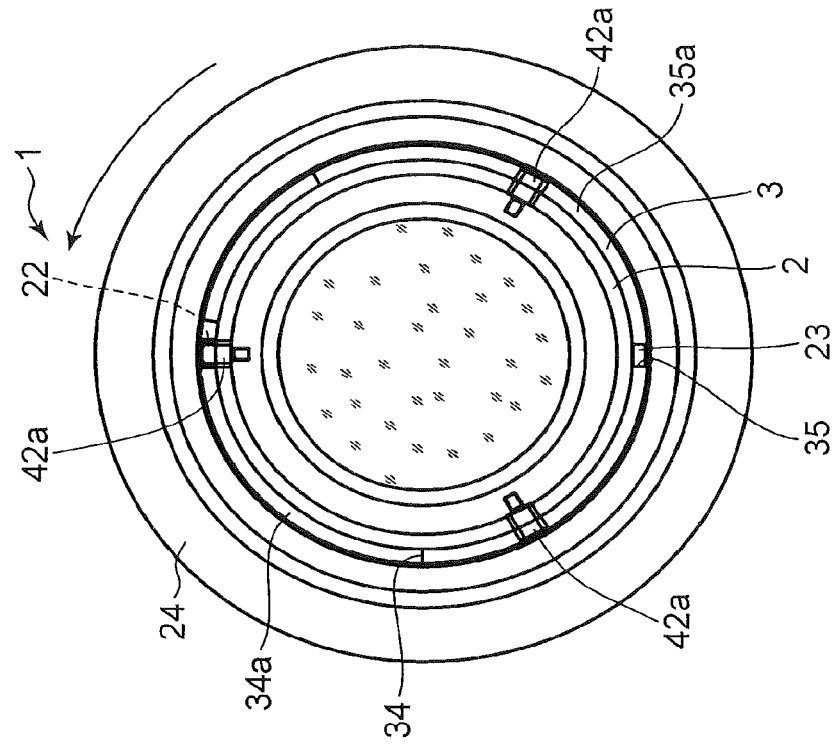

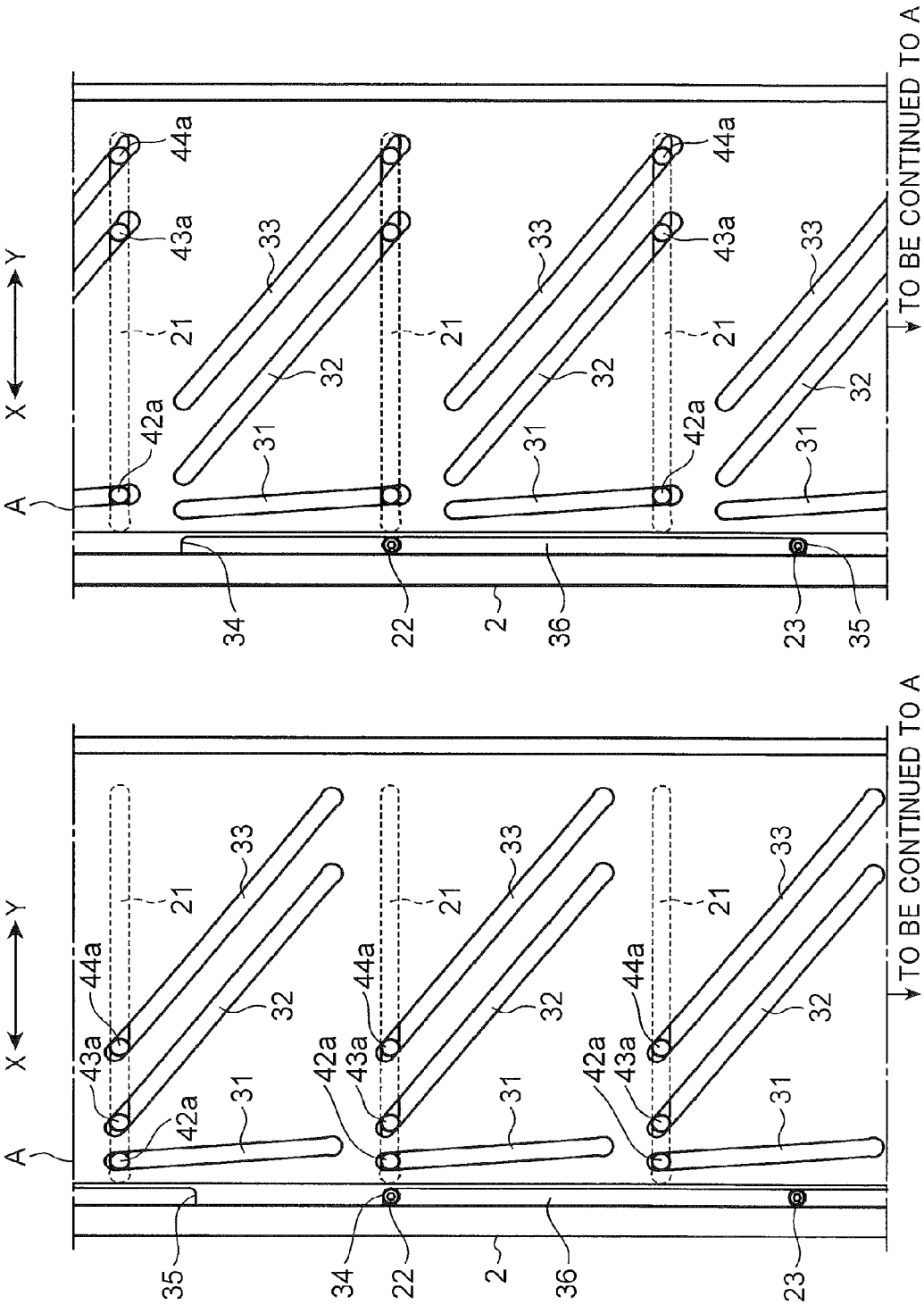

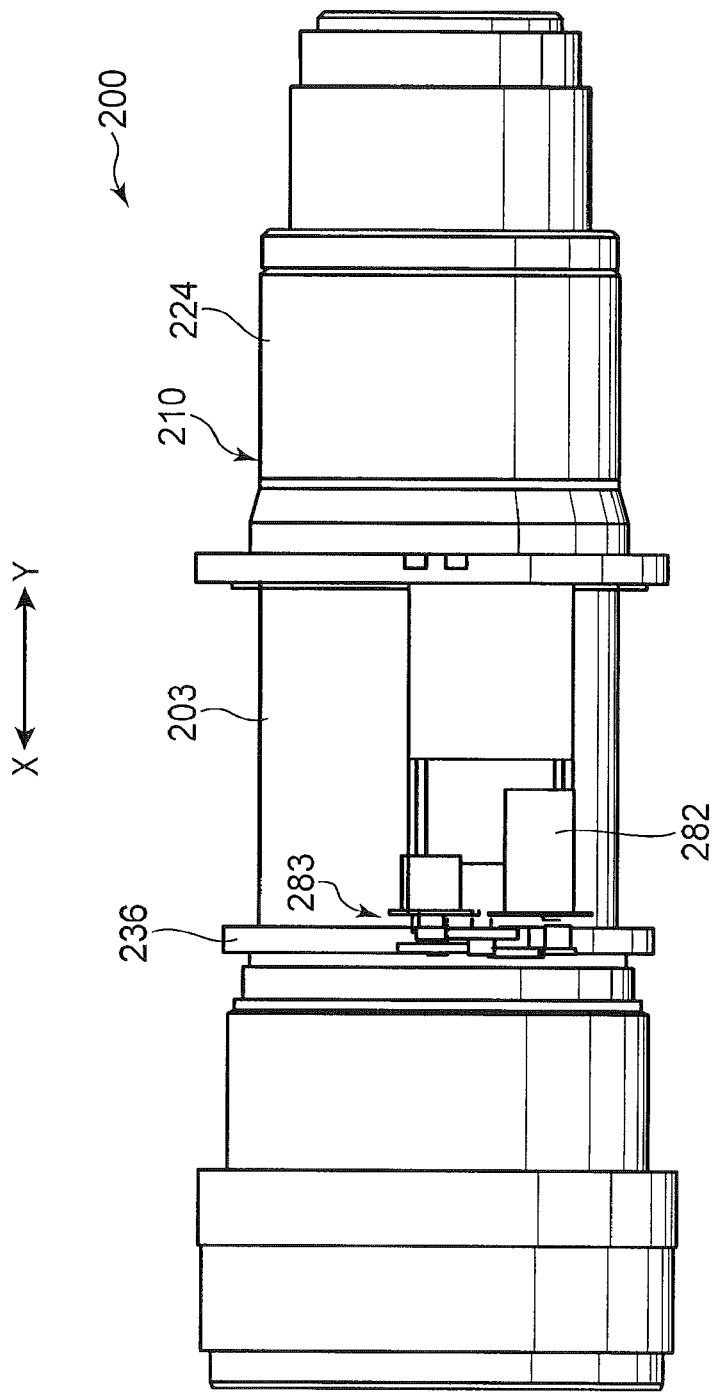

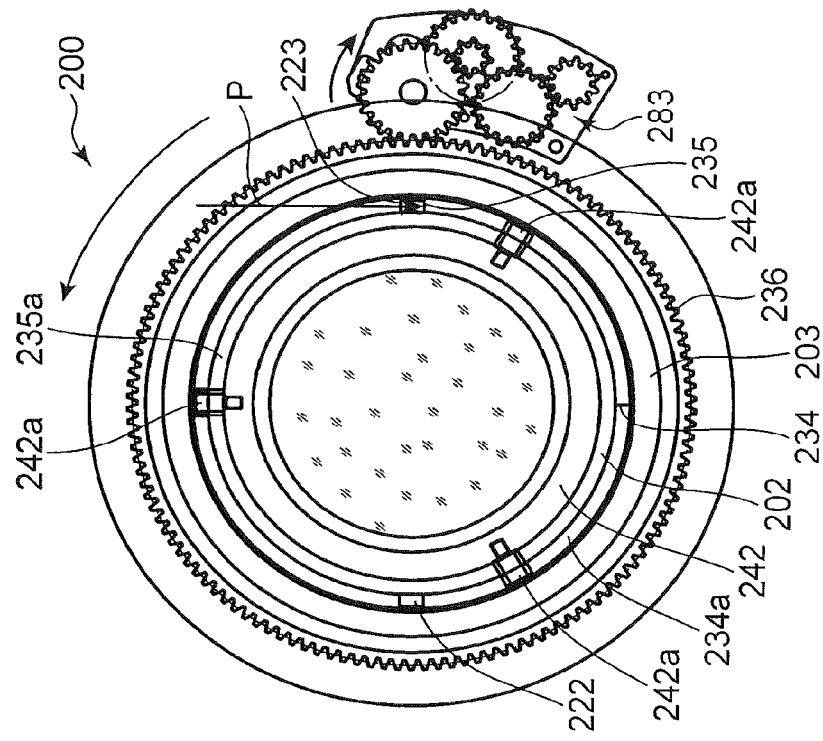
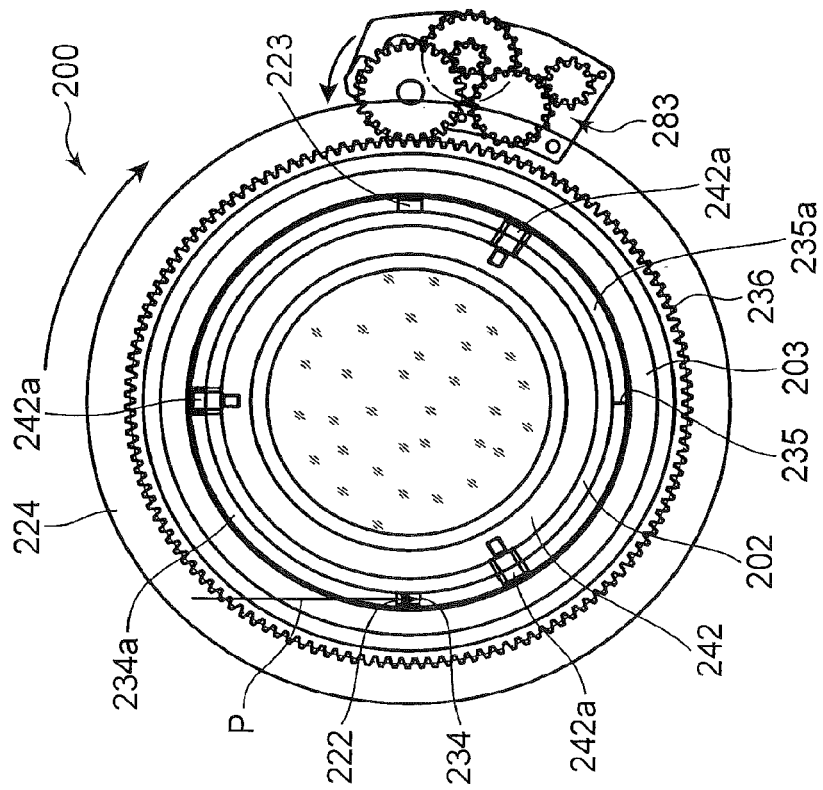

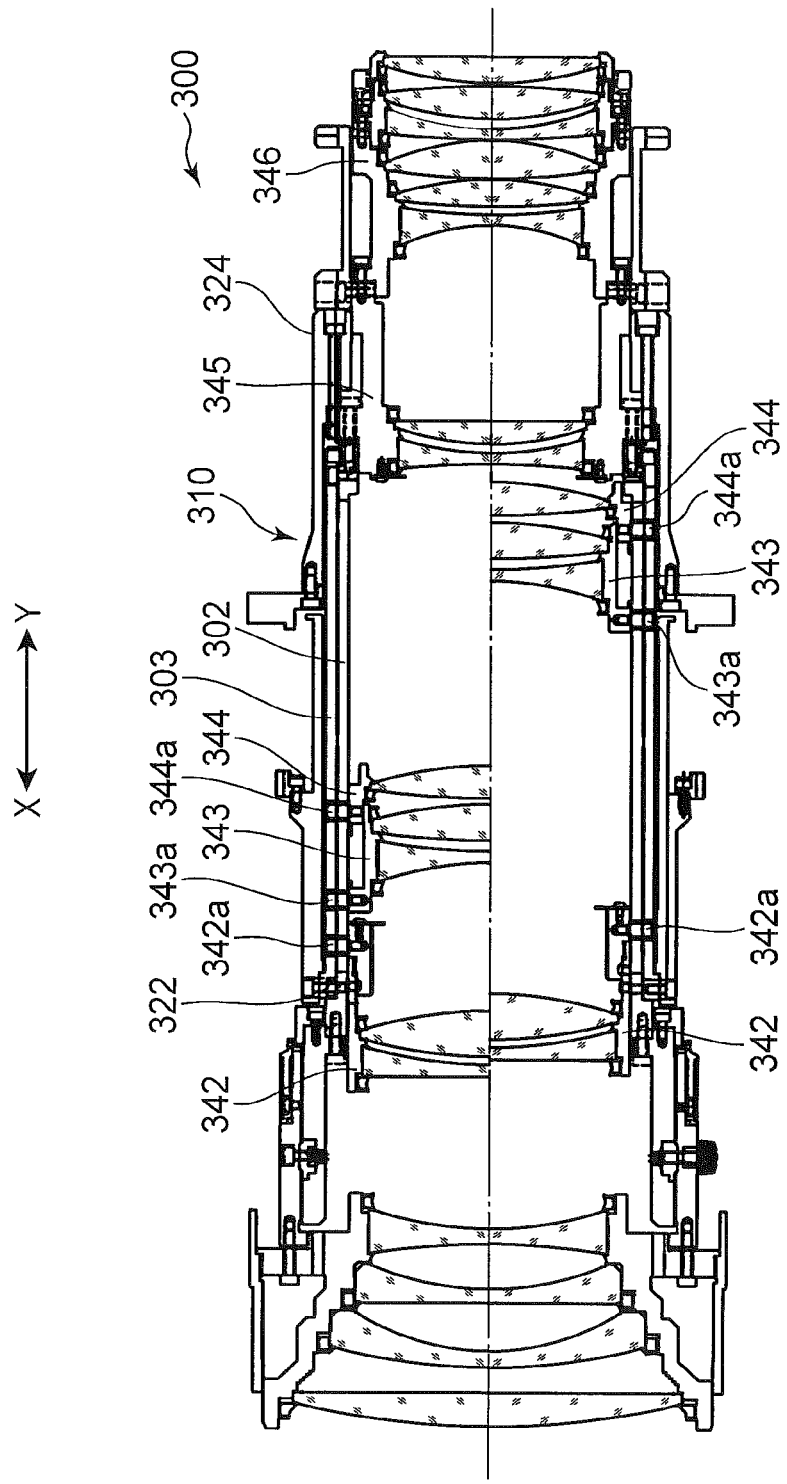

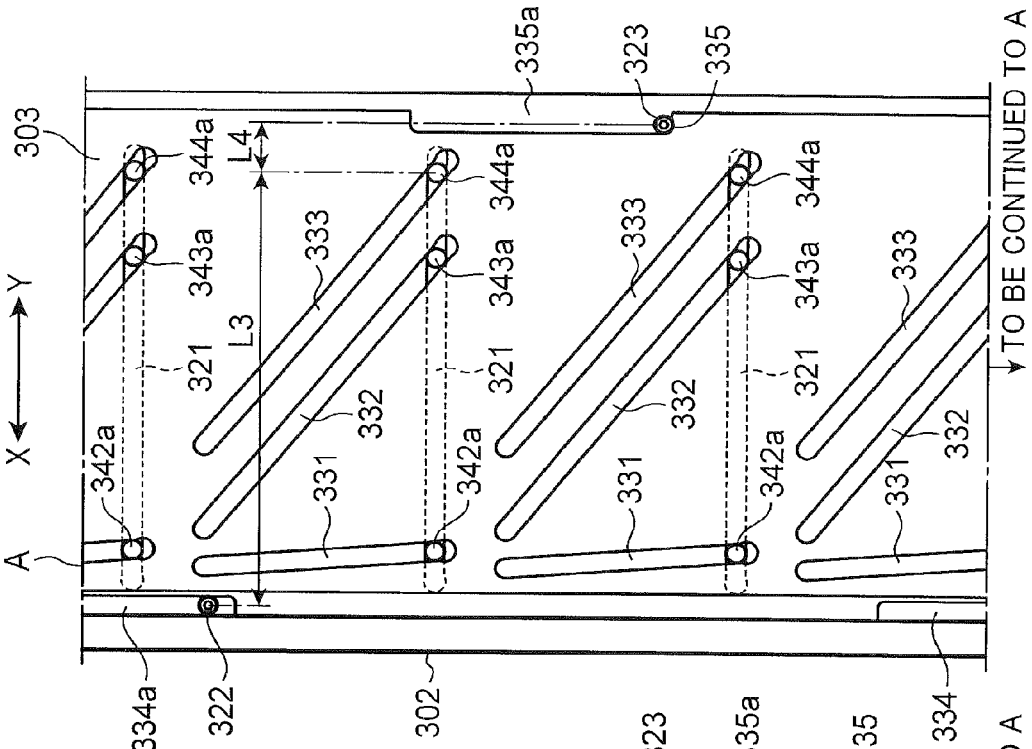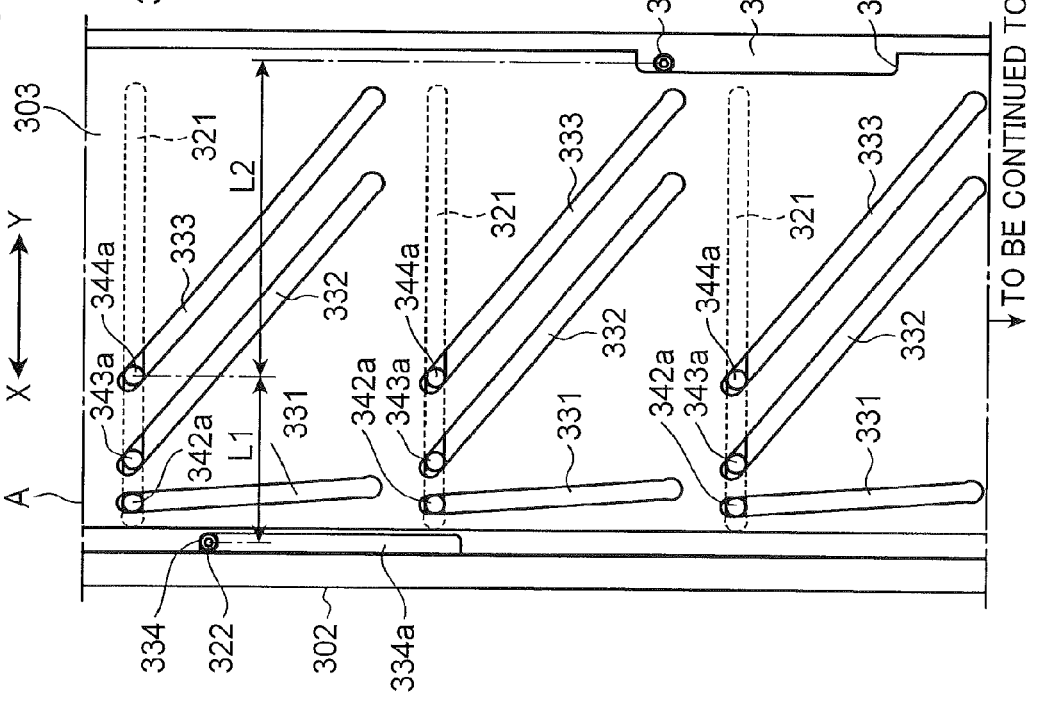

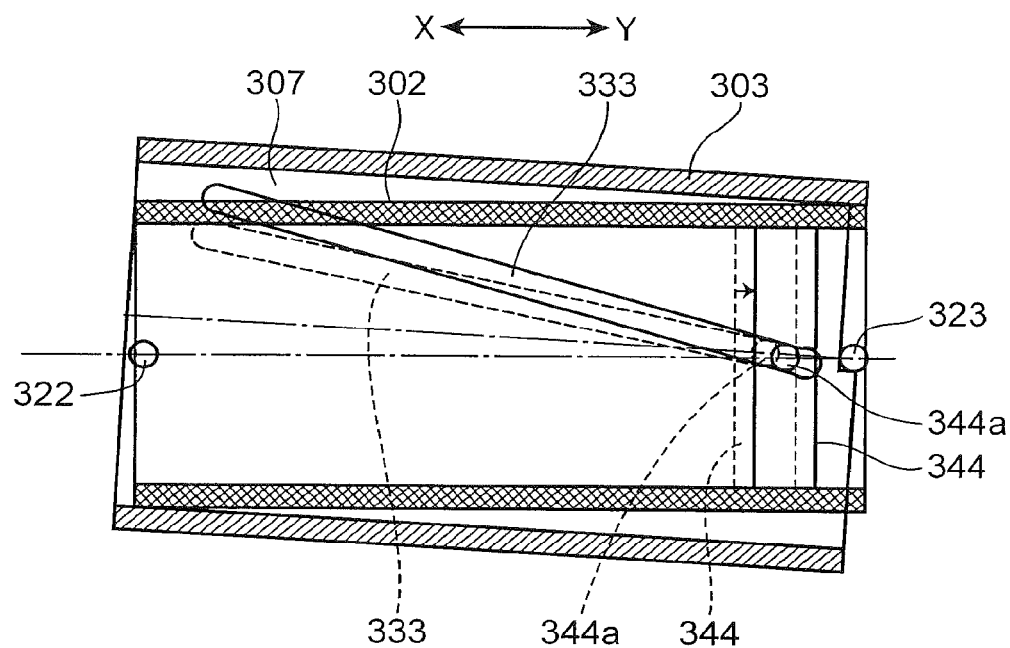
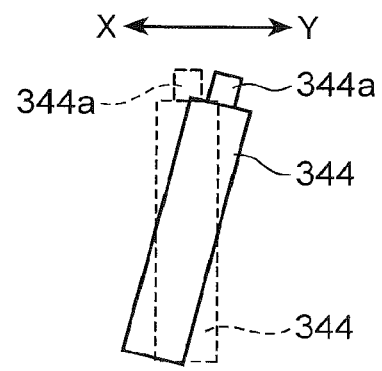

LENS BARREL AND PROJECTOR

BACKGROUND OF THE INVENTION

1. Field of the Invention

The present invention relates to a lens barrel for use in e.g. a projector or a camera, and a projector incorporated with the lens barrel.

2. Description of the Background Art

Conventionally, there has been known a lens barrel comprising a fixed cylinder, and a cam ring which is mounted on the fixed cylinder in such a manner as to be engaged with a lens holding frame for holding a movable lens group and to be rotatable about an optical axis. In the lens barrel, the movable lens group is moved with the lens holding frame in the optical axis direction by rotating the cam ring. In such a cam-driven lens barrel, as shown in FIGS. 19A to 19C for instance, in most of the cases, a stopper pin (projection) 101 formed on a fixed cylinder 100 is contacted with each of a first rotation restricting portion 103a and a second rotation restricting portion 103b formed on a cam ring 102, whereby the lens holding frame is stopped while restricting the rotation of the cam ring 102 at a zoom end.

In the above arrangement, however, since the above operation is performed by the single stopper pin 101, the following drawbacks are involved.

Specifically, in the cam-driven lens barrel, as shown in FIG. 19A, there is formed a slight fitting clearance 105 between the cam ring 102 and the fixed cylinder 100 for securing smooth driving of the cam ring 102. As a result, while the lens barrel is used, the fitting clearance 105 may be shifted to a lower side by the weight of the cam ring 102, and a maximum clearance portion 105a may be located at a lower position. Further, since the direction in which the cam ring 102 is shifted changes by restricting the rotation of the cam ring 102 at one of zoom ends, the position of the largest clearance portion 105a changes. Likewise, since the direction in which the cam ring 102 is shifted changes by restricting the rotation of the cam ring 102 at the other of the zoom ends, the position of the maximum clearance portion 105a also changes. As a result, a decentering direction of the movable lens group resulting from the fitting clearance 105 between the cam ring 102 and the fixed cylinder 100 changes depending on a zoom end, and a decentering amount increases. In particular, optical performance degradation between the zoom ends increases.

More specifically, for instance, as shown in FIG. 19B, if the cam ring 102 is rotated clockwise in the drawing of FIG. 19B, the first rotation restricting portion 103a of the cam ring 102 is abutted against the stopper pin 101 at one of zoom ends, and thereafter, when a force is exerted on the cam ring 102, the cam ring 102 is rotated around the first rotation restricting portion 103a (stopper pin 101) as the center of rotation, and the fitting clearance 105 is shifted to a left side, with the result that the maximum clearance portion 105a is located at a left position. On the other hand, as shown in FIG. 19C, if the cam ring 102 is rotated counterclockwise in the drawing of FIG. 19C, the second rotation restricting portion 103b of the cam ring 102 is abutted against the stopper pin 101, and thereafter, when a force is exerted on the cam ring 102, the cam ring 102 is rotated around the second rotation restricting portion 103b (stopper pin 101) as the center of rotation, and the fitting clearance 105 is shifted to a right side, with the result that the maximum clearance portion 105a is located at a right position opposite to the left position. In FIGS. 19A to 19C, the fitting clearance 105 is illustrated with a large size to simplify the description. Likewise, the drawings of FIGS. 6A to 6C, FIGS. 11A to 11C, FIGS. 16A to 16B, and FIGS. 17A to 17B are illustrated as such.

There is known a technology as proposed in Japanese Unexamined Patent Publication No. 2009-251315 (D1), as a technology for suppressing optical performance degradation resulting from a change in the shift direction of a cam ring with respect to a fixed cylinder at a zoom end. The technology provides an arrangement, wherein decentering resulting from a change in the shift direction due to a fitting clearance is suppressed by covering the cam ring with a tubular member having a projection on the outer circumference thereof for restricting a displacement amount of the cam ring at the projection, whereby optical performance degradation is suppressed.

The technology disclosed in D1, however, is also affected by an engagement state of a connecting portion between the fixed cylinder and the tubular member formed on the outer circumference of the cam ring. In other words, in the technology disclosed in D1, it is essentially required to define a clearance between the cam ring and the tubular member to an amount equal to or smaller than the displacement amount of the cam ring with respect to the fixed cylinder, and to connect the fixed cylinder and the tubular member without decentering. In view of this, in the technology disclosed in D1, certain product dimensional precision is required to secure a displacement suppressing effect, and an increase in the number of steps of connecting between the fixed cylinder and the tubular member is unavoidable, which may increase the manufacturing cost.

SUMMARY OF THE INVENTION

In view of the above, an object of the invention is to provide a lens barrel capable of easily and effectively suppressing optical performance degradation resulting from a change in the shift direction of a cam ring with respect to a fixed cylinder due to a fitting clearance at a zoom end, and a projector incorporated with the same.

A lens barrel and a projector according to the invention includes a fixed cylinder, and a cam ring mounted on the fixed cylinder. A first projection and a second projection are formed on one of the fixed cylinder and the cam ring, and a first rotation restricting portion and a second rotation restricting portion are formed on the other of the fixed cylinder and the cam ring. The first rotation restricting portion restricts rotation of the cam ring in a first direction by abutting contact with the first projection when the cam ring is rotated in the first direction, and the second rotation restricting portion restricts rotation of the cam ring in a second direction opposite to the first direction by abutting contact with the second projection when the cam ring is rotated in the second direction. The lens barrel and the projector thus constructed are advantageous in easily and effectively suppressing optical performance degradation resulting from a change in the shift direction of the cam ring with respect to the fixed cylinder due to a fitting clearance at a zoom end.

These and other objects, features and advantages of the present invention will become more apparent upon reading the following detailed description along with the accompanying drawings.

BRIEF DESCRIPTION OF THE DRAWINGS

FIG. 5A is a front sectional view showing a state that the first stopper pin is abutted against the first rotation restricting portion in the first embodiment, and FIG. 5B is a front sectional view showing a state that the second stopper pin is abutted against the second rotation restricting portion in the first embodiment;

FIG. 7A is a developed view showing a state that the first stopper pin is abutted against the first rotation restricting portion as a modification of the first embodiment, and FIG. 7B is a developed view showing a state that the second stopper pin is abutted against the second rotation restricting portion as the modification;

FIG. 8 is a side view of a projection lens for use in a projector incorporated with a lens barrel of a second embodiment;

FIG. 10A is a cross-sectional view showing a state that a first stopper pin is abutted against a first rotation restricting portion in the second embodiment, and FIG. 10B is a cross-sectional view showing a state that a second stopper pin is abutted against a second rotation restricting portion in the second embodiment;

FIG. 14 is a lateral sectional view of the projection lens for use in the projector incorporated with the lens barrel of the third embodiment;

FIG. 15A is a developed view showing a state that a first stopper pin is abutted against a first rotation restricting portion in the third embodiment, and FIG. 15B is a developed view showing a state that a second stopper pin is abutted against a second rotation restricting portion in the third embodiment;

FIG. 16A is an explanatory diagram in section showing a state that a cam ring is inclined in an axis direction due to a fitting clearance between a fixed cylinder and the cam ring in the third embodiment, and FIG. 16B is an explanatory diagram showing a fourth lens holding frame in this state;

FIG. 19A to 19C are explanatory diagrams of a conventional example, wherein FIG. 19A is an explanatory diagram in section showing a state that a fitting clearance is shifted to a lower side by the weight of a cam ring and a maximum clearance portion is located at a lower position, FIG. 19B is an explanatory diagram in section showing a state that a stopper pin is abutted against a first rotation restricting portion, and FIG. 19C is an explanatory diagram in section showing a state that the stopper pin is abutted against a second rotation restricting portion.

DETAILED DESCRIPTION OF THE PREFERRED EMBODIMENTS OF THE INVENTION

Figure 1A:
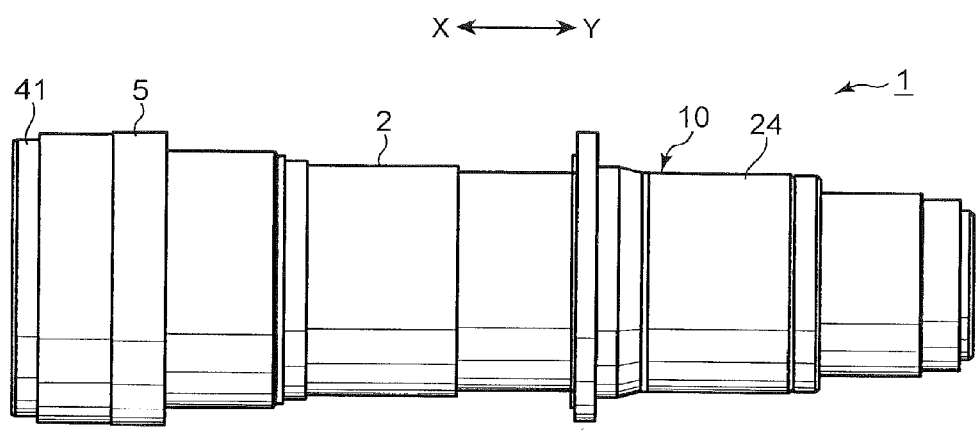
FIG. 1 is a side view of a projection lens for use in a projector incorporated with a lens barrel of a first embodiment, specifically, a side view of the projector.
Figure 1B:
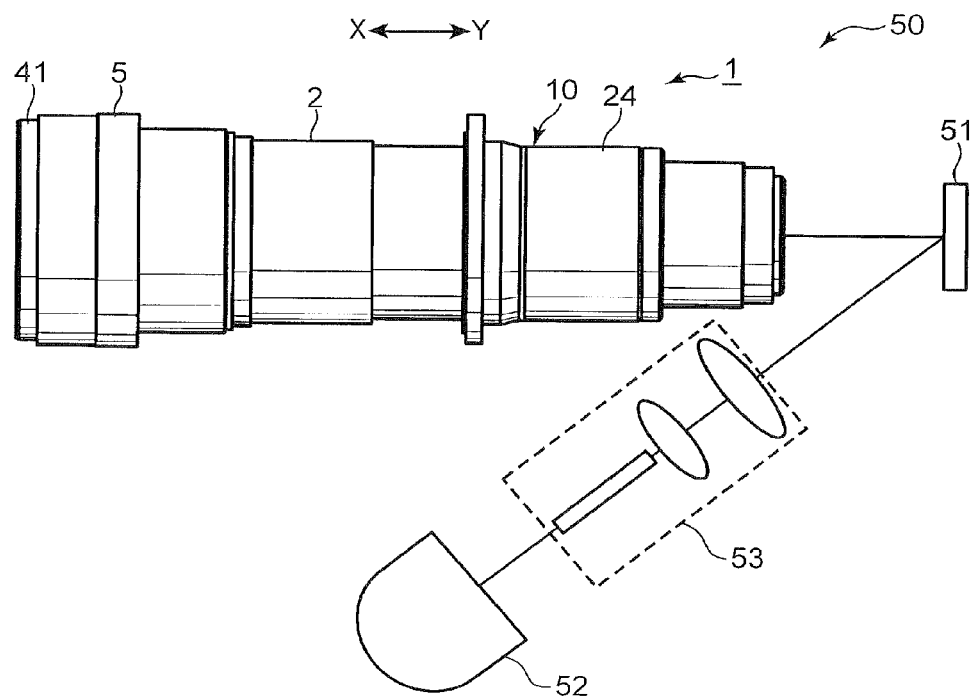

In the following, embodiments of the present invention are described in detail referring to the drawings. To simplify the description, X-direction corresponds to a forward direction (object side) and Y-direction corresponds to a rearward direction (image side) throughout the drawings.

(First Embodiment)

Figure 2:
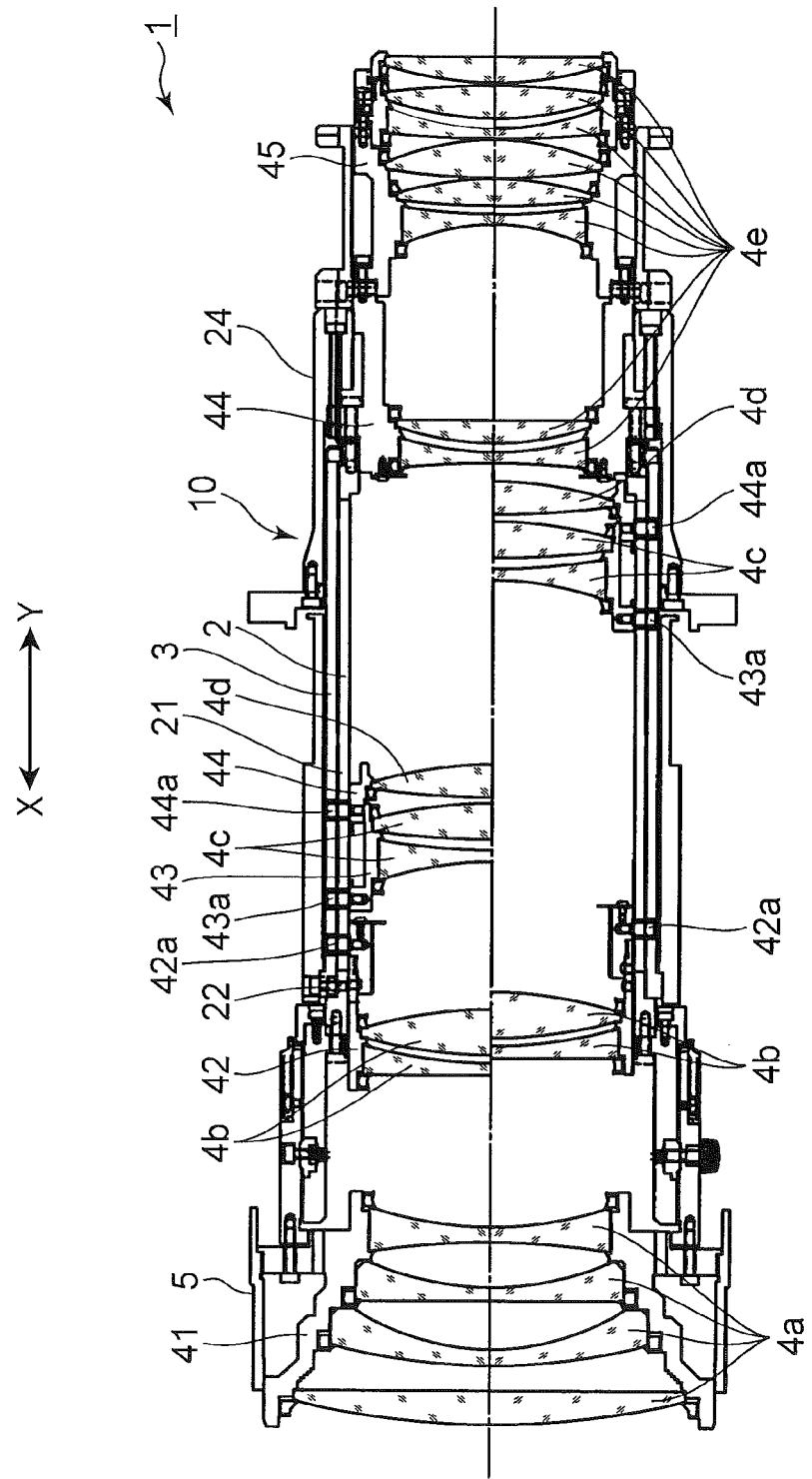
FIG. 2 is a lateral sectional view of the projection lens for use in the projector incorporated with the lens barrel of the first embodiment.

A projection lens of the first embodiment is described referring to FIGS. 1 to 6C. A projection lens 1 of the first embodiment is adapted for use in a projector. The projection lens 1 is provided with a lens barrel 10 and lens groups 4a to 4e. As shown in FIG. 2, the lens groups are comprised of the first lens group 4a serving as a focus mechanism portion, the second lens group 4b serving as a zoom mechanism portion, the third lens group 4c and the fourth lens group 4d, and the fifth lens group 4e as a fixed lens group. Each of these lens groups is comprised of one or more lens elements. As shown in FIG. 1B, for instance, a projector 50 is provided with the projection lens 1, an image display element 51 for displaying an image, a light source 52 for emitting illumination light, and an illumination optical system 53 for guiding the illumination light emitted from the light source 52 to the image display element 51. The image display element 51 is a space light modulator, such as a DMD (Digital Micromirror Device) or a liquid crystal panel, for modulating the illumination light based on an image signal inputted from an unillustrated imaging circuit for displaying an image. The projection lens 1 is loaded in the projector 50 in such a manner that the optical axis of the projection lens 1 is aligned with a horizontal direction.

The lens barrel 10 is provided with a tubular fixed cylinder 2, a tubular cam ring 3, and tubular lens holding frames 41 to 45 for holding the lens groups 4a to 4c.

Figure 3:
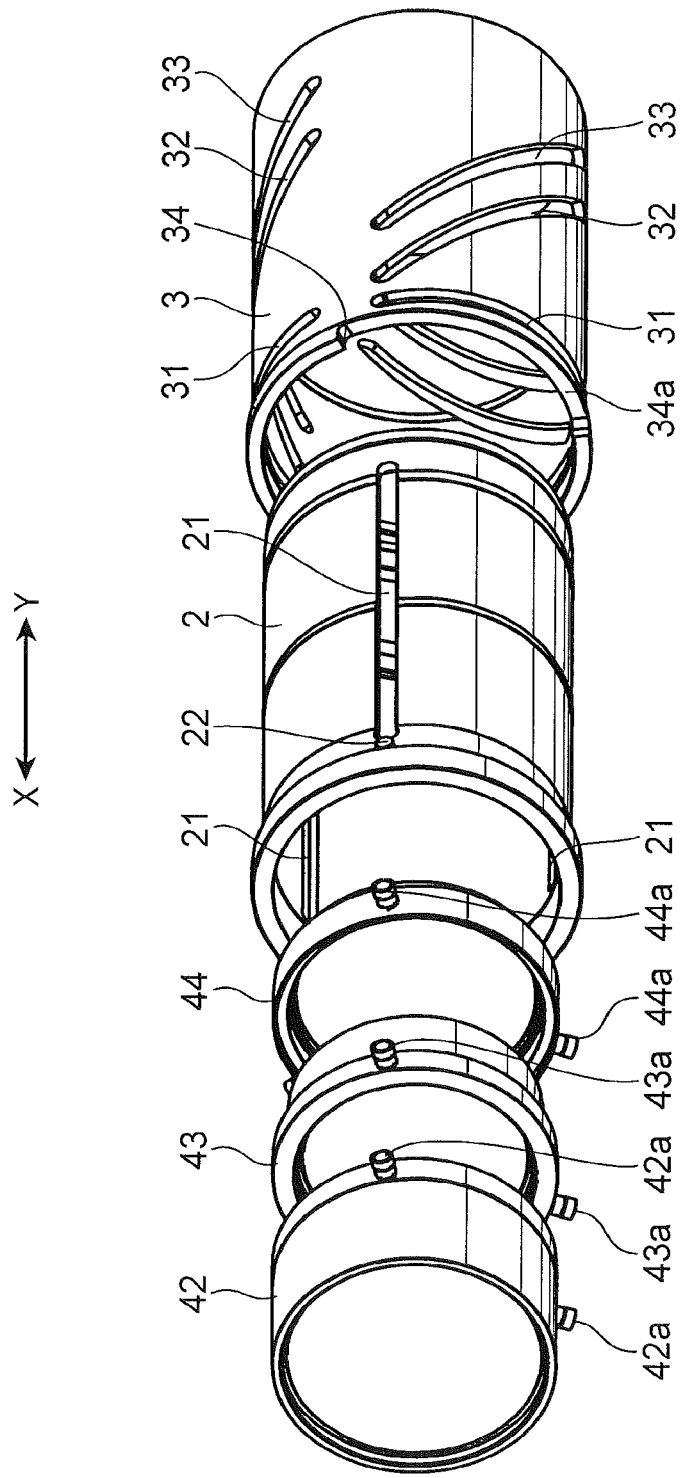
FIG. 3 is an exploded perspective view of a fixed cylinder, a cam ring and second to fourth lens holding frames.

As shown in FIG. 3, the fixed cylinder 2 is formed with guide grooves 21 in a surface thereof. Each of the guide groove 21 extends in the axis direction (optical axis direction) of the fixed cylinder 2 in such a manner as to pass through the inner surface and the outer surface of the fixed cylinder 2. In the first embodiment, the guide grooves 21 are formed at three positions equidistantly away from each other in the circumferential direction of the fixed cylinder 2. The axis of the fixed cylinder 2 is aligned with the optical axis.

Figure 4A:
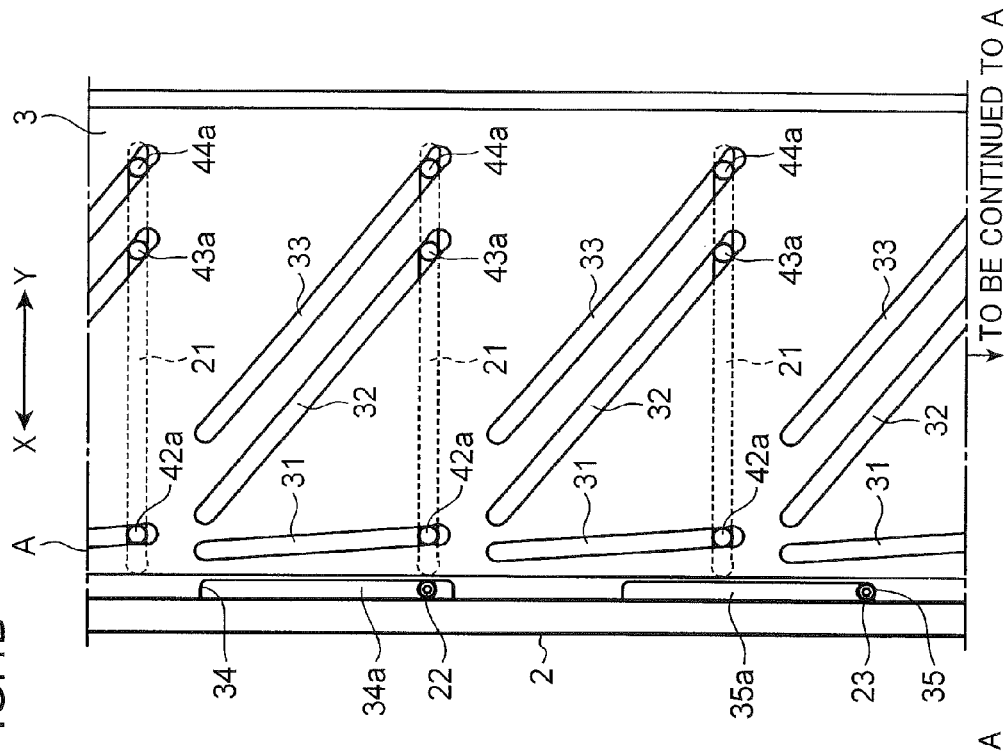
FIG. 4A is a developed view showing a state that a first stopper pin is abutted against a first rotation restricting portion in a state that the cam ring is mounted on the fixed cylinder.

As shown in FIG. 4A, a first stopper pin 22 as a first projection and a second stopper pin 23 as a second projection are formed at a front end outer circumference of the fixed cylinder 2.

Figure 6A:
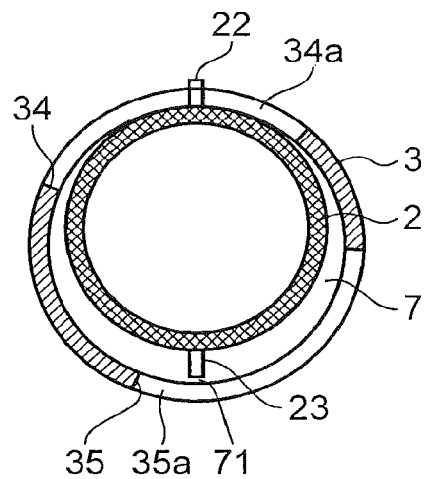
FIG. 6A is an explanatory diagram in section showing a state that a fitting clearance is shifted to a lower side by the weight of the cam ring and a maximum clearance portion is located at a lower position.
Figure 6B:
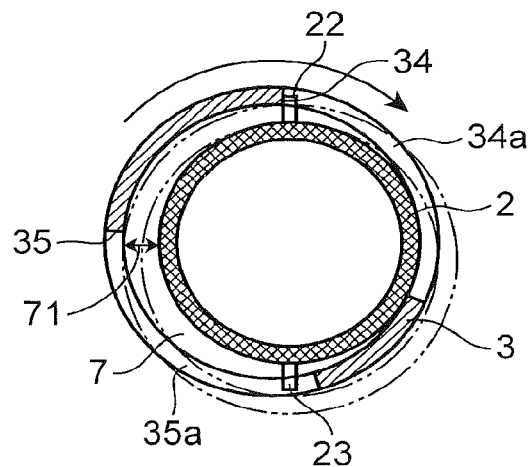
FIG. 6B is an explanatory diagram in section showing a state that the first stopper pin is abutted against the first rotation restricting portion.
Figure 6C:
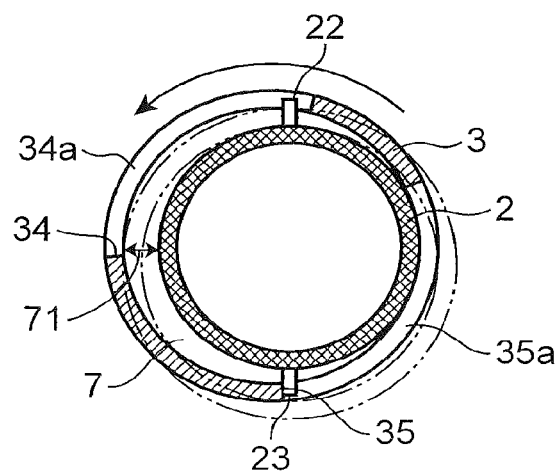
FIG. 6C is an explanatory diagram in section showing a state that the second stopper pin is abutted against the second rotation restricting portion.
Figure 9:
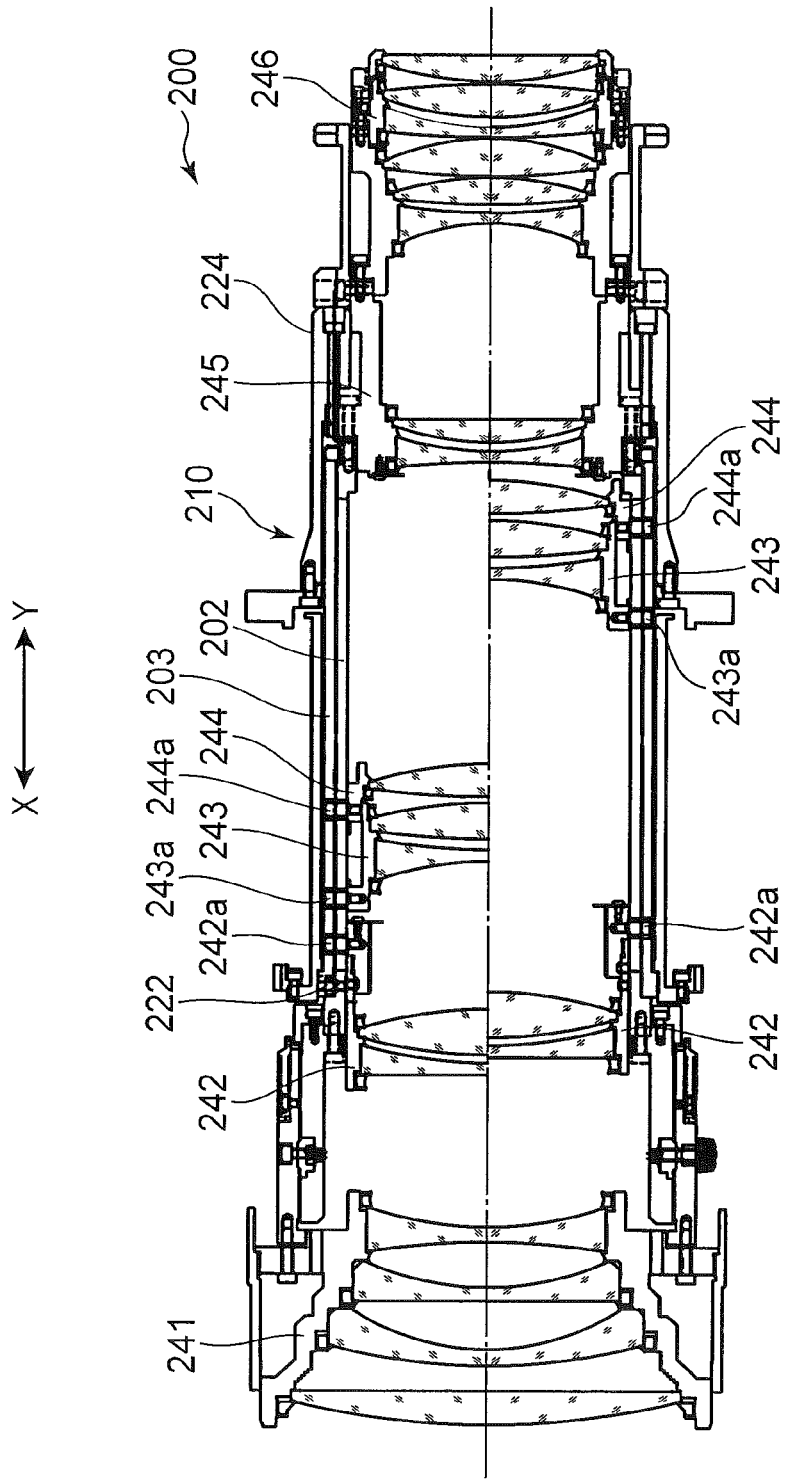
FIG. 9 is a lateral sectional view of the projection lens for use in the projector incorporated with the lens barrel of the second embodiment.

As shown in FIGS. 6A to 6C, the first stopper pin 22 projects from an upper end outer circumference at the front end of the fixed cylinder 2 radially outwardly toward the cam ring 3. The second stopper pin 23 projects from the front end outer circumference of the fixed cylinder 2 radially outwardly from the outer circumference of the fixed cylinder 2 at the same axial position as the first stopper pin 22 and at a lower end outer circumferential position circumferentially displaced from the first stopper pin 22 by 180°.

As shown in FIG. 2, the fixed cylinder 2 thus constructed has a rear end thereof fixedly coupled to a mount 24 provided on the lens barrel 10. The mount 24 is attached to an unillustrated projector body, whereby the lens barrel 10 is mounted on the projector body.

As shown in FIG. 3 and FIG. 4, the cam ring 3 has cam grooves in a surface thereof. Each of the cam grooves extends obliquely forwardly in such a manner as to pass through the inner surface and the outer surface of the cam ring 3, with a certain angle in the axis direction and in the circumferential direction.

The cam grooves in the first embodiment are comprised of a first cam groove 31 formed in a front portion of the cam ring 3, a second cam groove 32 formed at a rear position of the first cam groove 31, and a third cam groove 33 formed at a rear position of the second cam groove 32.

Each of the first to third cam grooves 31 to 33 is formed at three positions equidistantly and circumferentially away from each other. As shown in FIG. 4A, the first cam groove 31 is formed at an angle α1 larger than an angle α2 of the second cam groove 32 with respect to the axis direction, and has an axial length shorter than the axial length of the second cam groove 32.

The third cam groove 33 is formed at an angle α3 substantially equal to the angle α2 of the second cam groove 32 with respect to the axis direction, and has an axial length substantially equal to the axial length of the second cam groove 32.

As shown in FIGS. 3 to 6C, a front end surface of the cam ring 3 is formed with a first rotation restricting portion 34 to be contacted with the first stopper pin 22, and a second rotation restricting portion 35 to be contacted with the second stopper pin 23.

In the first embodiment, the first rotation restricting portion 34 and the second rotation restricting portion 35 are respectively formed at inner circumferential ends of a first recess portion 34a and a second recess portion 35a which are respectively formed in the front end surface of the cam ring 3.

More specifically, the first recess portion 34a has a certain depth from the front end surface of the cam ring 3, and has a certain length in the circumferential direction. One of the inner circumferential ends of the first recess portion 34a serves as the first rotation restricting portion 34.

The second recess portion 35a is formed at a position in the front end surface of the cam ring 3 circumferentially away from the first recess portion 34a by a certain distance in the same manner as the first recess portion 34a. One of the inner circumferential ends of the second recess portion 35a serves as the second rotation restricting portion 35. The second rotation restricting portion 35 is disposed at a position away from an extension between the first rotation restricting portion 34 and the axis of the cam ring 3.

The cam ring 3 thus constructed is held on the outer circumference of the fixed cylinder 2 in such a manner as to be rotatably mounted on the fixed cylinder 2 about the axis of the fixed cylinder 2.

The first stopper pin 22 is disposed in the first recess portion 34a, and the second stopper pin 23 is disposed in the second recess portion 35a in this state.

The lens holding frames are comprised of the first to fifth lens holding frames 41 to 45 for respectively holding the first lens group 4a to the fifth lens group 4e.

As shown in FIG. 2, in the first embodiment, the first lens holding frame 41 is held on the lens barrel 10 so as to be movable relative to a focusing cylinder 5 that is provided rotatably with respect to the fixed cylinder 2, and is moved in forward and rearward directions (optical axis direction), as the focusing cylinder 5 is rotated.

As shown in FIGS. 3 to 5C, the outer circumference of the second lens holding frame 42 is formed with three engaging members 42a equidistantly and circumferentially away from each other. Each of the engaging members 42a projects radially outwardly from the outer circumference of the second lens holding frame 42.

These engaging members 42a are respectively movably engaged in the guide grooves 21 of the fixed cylinder 2, and a distal end of the each respective engaging member 42a projecting from the corresponding guide groove 21 is engaged in the first cam groove 31 of the cam ring 3 to be movable with the cam ring 3.

The outer circumference of the third lens holding frame 43 is formed with three engaging members 43a equidistantly and circumferentially away from each other in the same manner as the second lens holding frame 42. These engaging members 43a respectively project radially outwardly from the outer circumference of the third lens holding frame 43.

These engaging members 43a are respectively movably engaged in the guide grooves 21 of the fixed cylinder 2, and a distal end of the each respective engaging member 43a projecting from the corresponding guide groove 21 is engaged in the second cam groove 32 of the cam ring 3 to be movable with the cam ring 3.

The outer circumference of the fourth lens holding frame 44 is formed with three engaging members 44a equidistantly and circumferentially away from each other in the same manner as the second lens holding frame 42. These engaging members 44a respectively project radially outwardly from the outer circumference of the fourth lens holding frame 44.

These engaging members 44a are respectively movably engaged in the guide grooves 21 of the fixed cylinder 2, and a distal end of the each respective engaging member 44a projecting from the corresponding guide groove 21 is engaged in the third cam groove 33 of the cam ring 3 to be movable with the cam ring 3.

As described above, in the first embodiment, the second lens holding frame 42 to the fourth lens holding frame 44 respectively holding the second lens group 4b to the fourth lens group 4d as the movable lens groups are engaged with the cam ring 3 via the engaging members 42a to 44a, and are moved in forward and rearward directions (optical axis direction), as the cam ring 3 is rotated.

The fifth lens holding frame 45 is disposed immovably relative to the fixed cylinder 2.

Next, an operation of the projection lens 1 thus constructed is described. As shown in FIG. 6A, in an initial state that the cam ring 3 is not operated, the cam ring 3 is set to such a state that a fitting clearance 7 between the cam ring 3 and the fixed cylinder 2 is shifted to a lower side by the weight of the cam ring 3 and a maximum clearance portion 71 is located at a lower position.

Then, the cam ring 3 is manually rotated clockwise in one direction in FIG. 6A from the above state. During the above operation, as shown in FIG. 4A, the engaging members 42a to 44a of the second lens holding frame 42 to the fourth lens holding frame 44 are moved in a forward direction along the cam grooves 31 to 33, and the second lens holding frame 42 to the fourth lens holding frame 44 are moved in the forward direction. Finally, as shown in FIGS. 5A and 6B, the first stopper pin 22 is abutted against the first rotation restricting portion 34, and the rotation of the cam ring 3 is stopped at a telephoto end (one of zoom ends). In this state, the second stopper pin 23 is not contacted with the second rotation restricting portion 35.

Then, when a force is exerted on the cam ring 3 in a state that the first rotation restricting portion 34 is abutted against the first stopper pin 22, the rotation force exerted on the cam ring 3 is such that the cam ring 3 is rotated around the first stopper pin 22 (first rotation restricting portion 34) as a center of rotation by an amount corresponding to the fitting clearance 7, whereby the fitting clearance 7 is shifted to the left side in FIGS. 5A and 6B and the maximum clearance portion 71 is located at a left position.

Figure 4B:
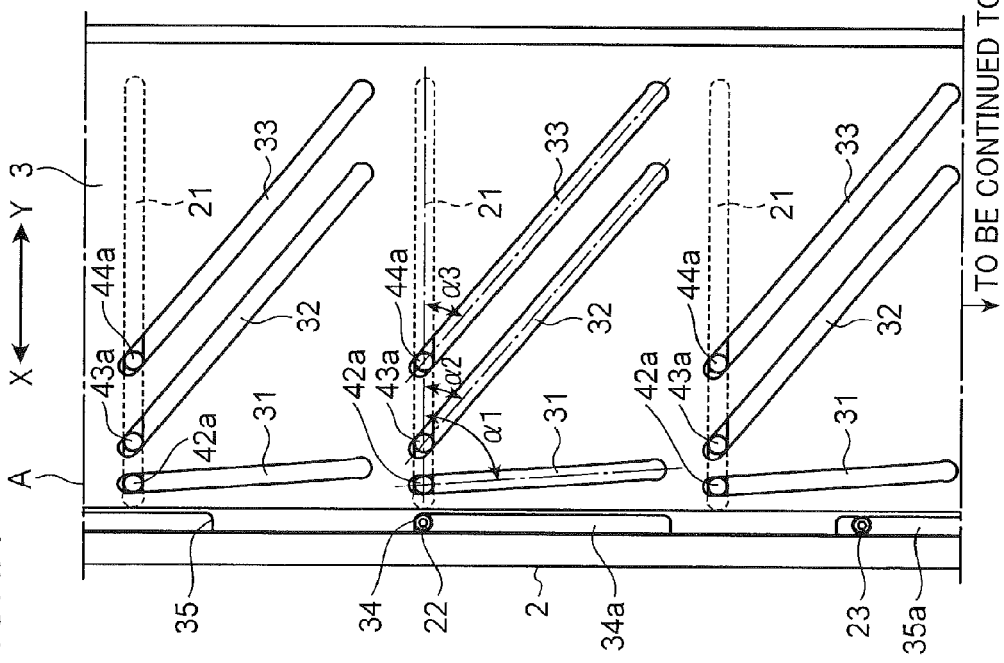
FIG. 4B is a developed view showing a state that a second stopper is abutted against a second rotation restricting portion in the mounted state.

On the other hand, when the cam ring 3 is manually rotated counterclockwise in the opposite direction in FIG. 6A, as shown in FIG. 4B, the engaging members 42a to 44a of the second lens holding frame 42 to the fourth lens holding frame 44 are respectively moved in a rearward direction along the cam grooves 31 to 33, and the second lens holding frame 42 to the fourth lens holding frame 44 are moved in the rearward direction. Finally, as shown in FIGS. 5B and 6C, the second stopper pin 23 is abutted against the second rotation restricting portion 35, and the rotation of the cam ring 3 is stopped at a wide angle end (the other of the zoom ends). In this state, the first stopper pin 22 is not contacted with the first rotation restricting portion 34.

Then, when a force is exerted on the cam ring 3 in a state that the second rotation restricting portion 35 is abutted against the second stopper pin 23, the rotation force exerted on the cam ring 3 is such that the cam ring 3 is rotated around the second stopper pin 23 (second rotation restricting portion 35) as a center of rotation by an amount corresponding to the fitting clearance 7, whereby the fitting clearance 7 is shifted to the left side in FIGS. 5B and 6C and the maximum clearance portion 71 is located at a left position. Thus, the shift direction of the fitting clearance 7 is the same as in the case of the telephoto end.

Figure 19A:
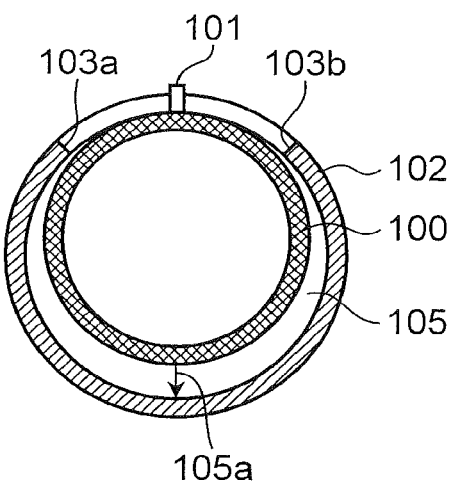
Figure 19B:
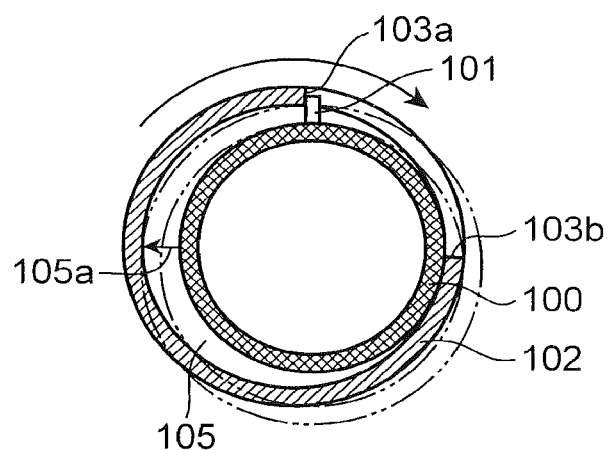
Figure 19C:
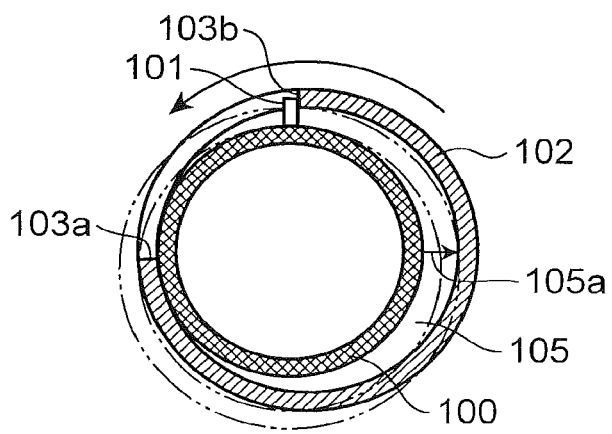

As described above, with use of the lens barrel 10 of the first embodiment, it is possible to prevent such a drawback that a fitting clearance is shifted in directions opposite to each other and a maximum clearance portion is located at positions opposite to each other between one (telephoto end) of zoom ends and the other (wide angle end) of the zoom ends, unlike the conventional example wherein a cam ring is stopped at the zoom ends by the single stopper pin 101 (see FIGS. 19A to 19C). Thus, it is possible to reduce a decentering amount between the zoom ends, as compared with the conventional example. Accordingly, the lens barrel 10 of the first embodiment enables to suppress optical performance degradation.

In the first embodiment, there are formed two recess portions i.e. the first recess portion 34a and the second recess portion 35a, and one of the inner circumferential ends of the first recess portion 34a serves as the first rotation restricting portion 34a, and one of the inner circumferential ends of the second recess portion 35a serves as the second rotation restricting portion 35. The embodiment, however, may be modified, as necessary.

For instance, as shown in FIG. 7A to 7B, a front end surface of a cam ring 3 may be formed with a recess portion 36, one of inner circumferential ends of the recess portion 36 may serve as a first rotation restricting portion 34, and the other of the inner circumferential ends of the recess portion 36 may serve as a second rotation restricting portion 35.

Further alternatively, as shown in FIG. 7A, the lens barrel may be constructed in such a manner that when the cam ring 3 is rotated in one direction, the first rotation restricting portion 34 is abutted against the first stopper pin 22 while the second rotation restricting portion 35 is not contacted with the second stopper pin 23, and as shown in FIG. 7B, when the cam ring 3 is rotated in the other direction, the second rotation restricting portion 35 is abutted against the second stopper pin 23 while the first rotation restricting portion 34 is not contacted with the first stopper pin 22.

(Second Embodiment)

Next, a projection lens 200 for use in a projector of the second embodiment is described referring to FIGS. 8 to 12.

A lens barrel 210 in the projection lens 200 of the second embodiment is provided with a fixed cylinder 202, a cam ring 203, and lens holding frames 241 to 245 in the same manner as in the first embodiment. The lens barrel 210 is further provided with a motor unit. Further, the cam ring 203 in the second embodiment is provided with a gear portion 236 on the outer circumference of the cam ring 203.

The motor unit is supported on a mount 224, and is provided with a motor 282, and a drive gear 283 comprised of a gear group having a plurality of gears. In the second embodiment, the motor 282 has a torque limiter mechanism for cutting off torque transmission when an overload is exerted on the cam ring 203.

The drive gear 283 is connected to the gear portion 236 of the cam ring 203 and to the motor 282 so that rotation of the drive gear 283 is transmitted to the gear portion 236 and to the motor 282. The cam ring 203 is rotated by actuation of the motor 282 via the drive gear 283 and the gear portion 236.

The fixed cylinder 202 in the second embodiment is provided with a first stopper pin 222 and a second stopper pin 223 in the same manner as in the first embodiment, except for the following. Specifically, as shown in FIG. 10 and FIG. 11, the first stopper pin 222 in the second embodiment is disposed at a left end on the outer circumference of the fixed cylinder 202. The second stopper pin 223 in the second embodiment is disposed at a right end on the outer circumference of the fixed cylinder 202. Since the elements other than the above are the same as those in the first embodiment, the description thereof is omitted herein.

Figure 11A:
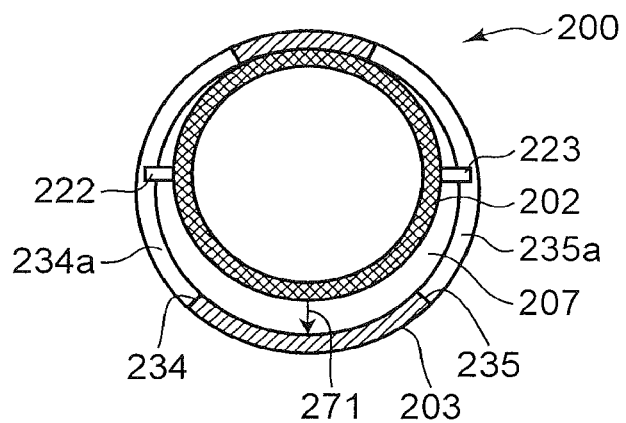
FIG. 11A is an explanatory diagram in section showing a state that a fitting clearance is shifted to a lower side by the weight of a cam ring and a maximum clearance portion is located at a lower position in the second embodiment.

Next, an operation of the projection lens 200 in the second embodiment is described. In an initial state that the cam ring 203 is not rotated, as shown in FIG. 11A, the cam ring 203 is constructed in such a manner that a fitting clearance 207 between the cam ring 203 and the fixed cylinder 202 is shifted to a lower side and a maximum clearance portion 271 is located at a lower position by the weight of the cam ring 203 in the same manner as in the first embodiment.

Figure 11B:
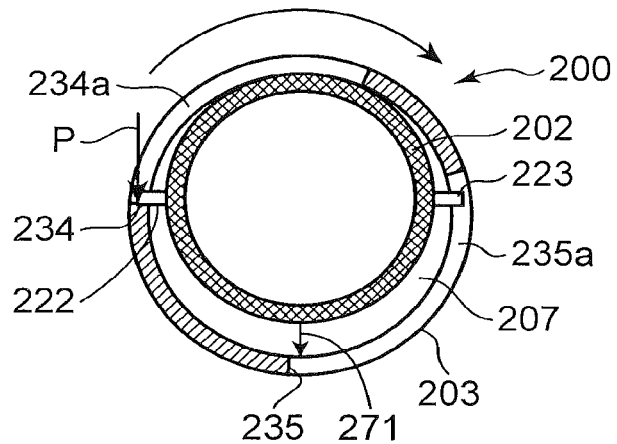
FIG. 11B is an explanatory diagram in section showing a state that the first stopper pin is abutted against the first rotation restricting portion in the second embodiment.

When an unillustrated motor actuation switch is turned on and the motor 282 starts to be driven from the above state, the cam ring 203 is rotated clockwise in FIGS. 10A and 11B via the drive gear 283 and the gear portion 236, and engaging members 242a to 244a of second lens holding frame 242 to fourth lens holding frame 244 are respectively moved along cam rings 231 to 233, whereby the second lens holding frame 242 to the fourth lens holding frame 244 are moved in a forward direction. Finally, the first stopper pin 222 is abutted against a first rotation restricting portion 234, and the rotation of the cam ring 203 is stopped at a telephoto end (one of zoom ends). In this state, the second stopper pin 223 is not contacted with a second rotation restricting portion 235.

Since the first stopper pin 222 is disposed at the left end of the fixed cylinder 202, as shown in FIGS. 10A and 11B, during the above operation, the cam ring 203 receives a force P from the first stopper pin 222 in the direction of a gravitational force. As a result, the cam ring 203 is less likely to be raised, and the cam ring 203 is kept in the initial state, as shown in FIG. 11A, that the fitting clearance 207 between the cam ring 203 and the fixed cylinder 202 is shifted to the lower side and the maximum clearance portion 271 is located at the lower position. Thus, the lens barrel 210 of the second embodiment is more advantageous in suppressing optical performance degradation, as compared with the lens barrel 10 of the first embodiment.

Figure 11C:
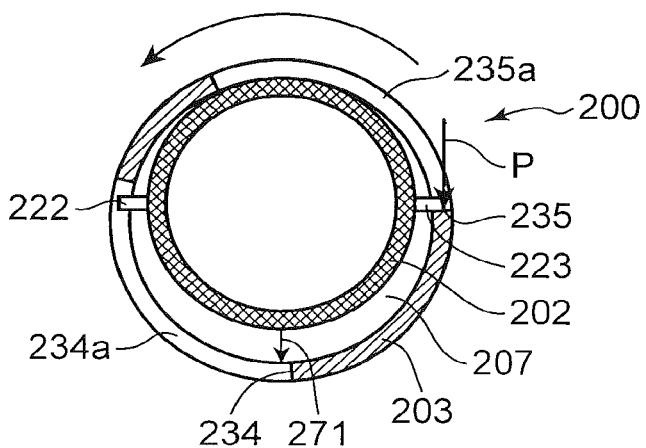
FIG. 11C is an explanatory diagram in section showing a state that the second stopper pin is abutted against the second rotation restricting portion in the second embodiment.

When the motor 282 starts to be rotated in a direction opposite to the above, as shown in FIGS. 10B and 11C, the cam ring 203 is rotated counterclockwise via the drive gear 283 including the gear group, and the engaging members 242a to 244a of the second lens holding frames 242 to the fourth lens holding frame 244 are respectively moved in a rearward direction along the cam grooves 231 to 233, whereby the second lens holding frame 242 to the fourth lens holding frame 244 are moved in the rearward direction. Finally, the second rotation restricting portion 235 is abutted against the second stopper pin 223, and the rotation of the cam ring 203 is stopped at the wide angle end (the other of the zoom ends). In this state, the first stopper pin 222 is not contacted with the first rotation restricting portion 234.

Since the second stopper pin 223 is disposed at the right end of the fixed cylinder 202, during the above operation, the cam ring 203 receives a force P from the second stopper pin 223 in the direction of a gravitational force. As a result, the cam ring 203 is less likely to be raised, and the cam ring 203 is kept in the initial state, as shown in FIG. 11A, that the fitting clearance 207 between the cam ring 203 and the fixed cylinder 202 is shifted to the lower side and the maximum clearance portion 271 is located at the lower position. Thus, the lens barrel 210 of the second embodiment is more advantageous in suppressing optical performance degradation, as compared with the lens barrel 10 of the first embodiment.

Preferably, for obtaining the aforementioned effect, the first rotation restricting portion 34 and the second rotation restricting portion 35 may be disposed at such positions that at least one of a line segment connecting the first rotation restricting portion 34 and the optical axis, and a line segment connecting the second rotation restricting portion 35 and the optical axis lies in the range of ±30° (the range from −30° to +30°) with respect to the horizontal direction while the lens barrel 210 having the optical axis in alignment with the horizontal direction is used.

Figure 12:
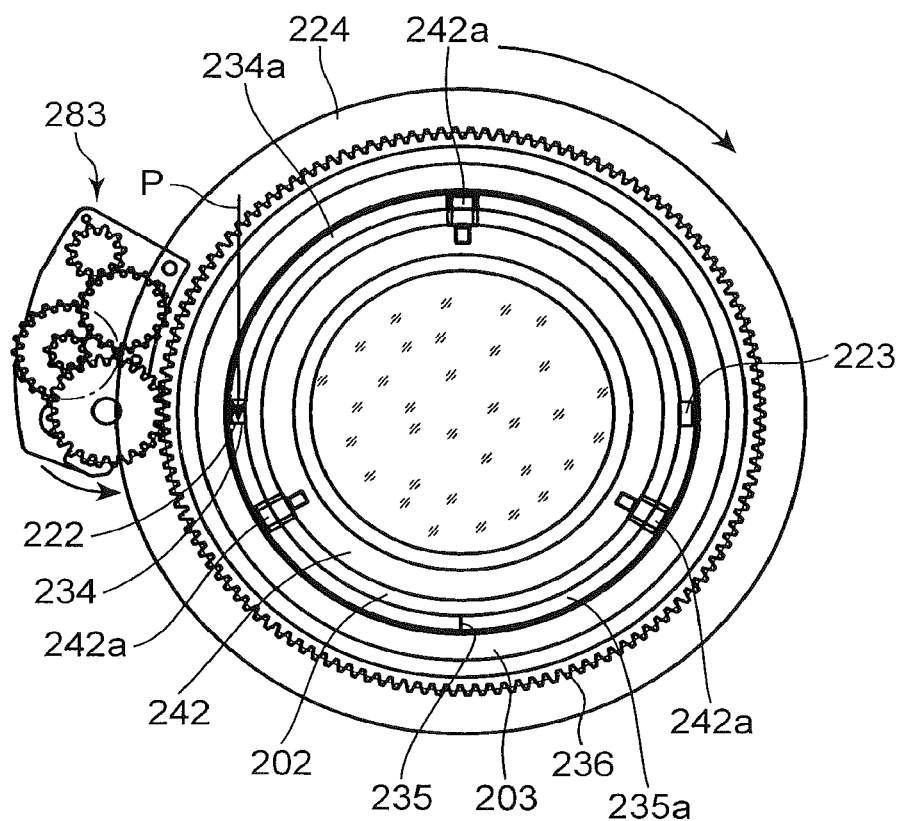
FIG. 12 is a front sectional view of a modification of the second embodiment.
Figure 13:
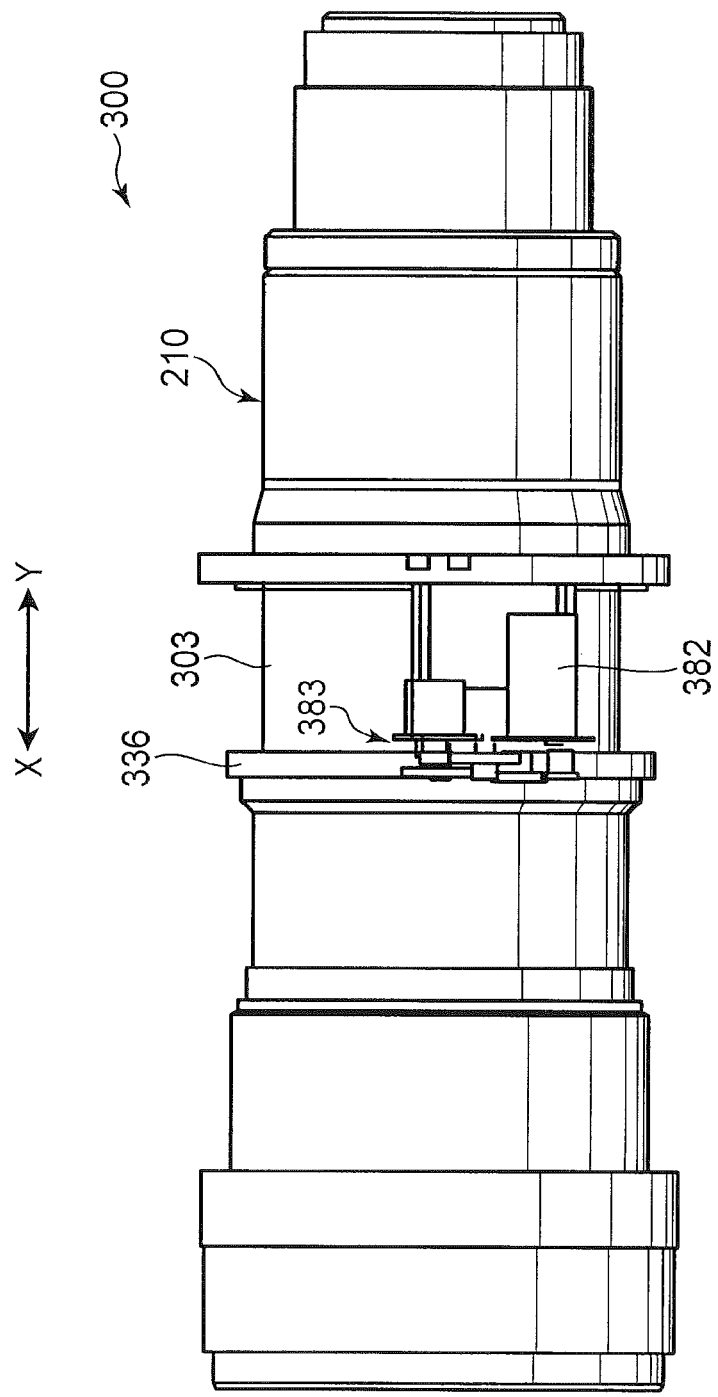
FIG. 13 is a side view of a projection lens for use in a projector incorporated with a lens barrel of a third embodiment.

In the second embodiment, the motor unit including the motor 282 and the drive gear 283 is disposed on the left end side of the lens barrel 210 (in FIGS. 10A and 10B, on the right end side). The disposed positions of the motor 282 and the drive gear 283 are not specifically limited to the above. For instance, as shown in FIG. 12, the drive gear 283 may be disposed on the right end side (in FIG. 12, on the left end side) of the lens barrel 210, as necessary.

(Third Embodiment)

Next, a projection lens 300 for use in a projector of the third embodiment is described referring to FIGS. 13 to 16B.

A lens barrel 310 in the projection lens 300 of the third embodiment is provided with a fixed cylinder 302, a cam ring 303, and lens holding frames 341 to 345, as well as in the second embodiment; and is further provided with a gear portion 336, a motor 382 and a drive gear 383. Since the lens holding frame 341 to 345, the gear portion 336, the motor 382 and the drive gear 383 have substantially the same arrangement as in the second embodiment, the description thereof is omitted herein.

The fixed cylinder 302 in the third embodiment is provided with a first stopper pin 322 and a second stopper pin 323 in the same manner as in the second embodiment. However, in the third embodiment, as shown in FIGS. 15A and 15B, the first stopper 322 is provided at a front end outer circumference of the fixed cylinder 302, and the second stopper pin 323 is provided at a rear end outer circumference of the fixed cylinder 302. In other words, the first stopper 322 and the second stopper 323 are axially disposed away from each other by a certain distance.

A front end surface of the cam ring 303 is formed with a first recess portion 334a having a first rotation restricting portion 334 to be contacted with the first stopper pin 322, and a rear end surface of the cam ring 303 is formed with a second recess portion 335a having a second rotation restricting portion 335 to be contacted with the second stopper pin 323. Since the arrangement other than the above is substantially the same as in the second embodiment, the description thereof is omitted herein.

Next, an operation of the projection lens 300 in the third embodiment is described. When the motor 382 is actuated in a certain direction by turning on an unillustrated motor actuation switch, the cam ring 303 is rotated via a gear group 383 and the drive gear 336 in the same manner as in the second embodiment, and engaging members 342a to 344a of second lens holding frame 342 to fourth lens holding frame 344 are moved in a forward direction along cam grooves 331 to 333, as shown in FIG. 15A, whereby the second lens holding frame 342 to the fourth lens holding frame 344 are moved in the forward direction. Finally, the first rotation restricting portion 334 is abutted against the first stopper pin 322, and the rotation of the cam ring 303 is stopped at a telephoto end (first position).

The second stopper pin 323 is not contacted with the second rotation restricting portion 335 in this state. Further, a distance L1 between the first stopper pin 322, and the engaging member 344a of the fourth lens holding frame 344 as a lens holding frame holding a lens group having a largest moving distance to be described later in the optical axis direction is set shorter than a distance L2 between the second stopper pin 323 and the engaging member 344a in the optical axis direction.

When the motor 382 starts to be rotated in the direction opposite to the above direction, the cam ring 302 is rotated in the direction opposite to the above direction via the gear group 383 and the drive gear 336, and as shown in FIG. 15B, the engaging members 342a to 344a of the second lens holding frame 342 to the fourth lens holding frame 344 are moved in a rearward direction along the cam grooves 331 to 333, whereby the second lens holding frame 342 to the fourth lens holding frame 344 are moved in the rearward direction. Finally, the second stopper pin 323 is abutted against the second rotation restricting portion 335, and the rotation of the cam ring 303 is stopped at a wide angle end (second position).

The first stopper pin 322 is not contacted with the first rotation restricting portion 334 in this state. Further, a distance L4 between the second stopper pin 323, and the engaging member 344a of the fourth lens holding frame 344 in the optical axis direction is set shorter than a distance L3 between the first stopper pin 322 and the engaging member 344a in the optical axis direction.

There is a case that the center axis of the cam ring 303 may be inclined with respect to the center axis of the fixed cylinder 302 depending on a fitting clearance 307 (see FIG. 16A) between the fixed cylinder 302 and the cam ring 303 at the telephoto end and at the wide angle end. The center axis of the cam ring 303 is inclined at the telephoto end in such a manner that the cam ring 303 swings about the first stopper pin 322 (first rotation restricting portion 334), and is inclined at the wide angle end in such a manner that the cam ring 303 swings about the second stopper pin 323 (second rotation restricting portion 335). When the center axis of the cam ring 303 is inclined as described above, the positions of the cam grooves 331 to 333 are displaced relative to guide grooves 321 in the fixed cylinder 302, with the result that the lens holding frames are inclined with respect to a plane orthogonal to the optical axis direction. This may adversely affect the optical performance.

Figure 17A:
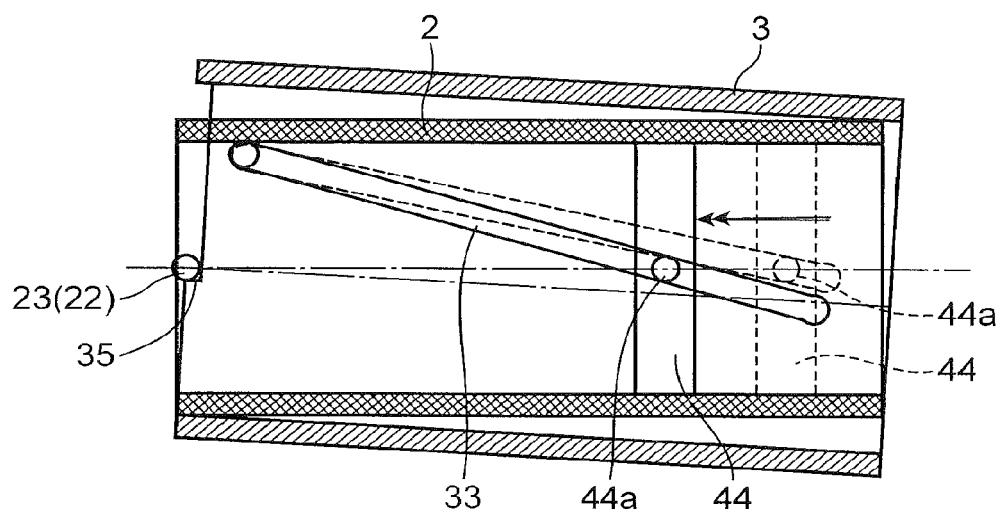
FIG. 17A is an explanatory diagram in section showing a state that the cam ring is inclined in an axis direction due to a fitting clearance between the fixed cylinder and the cam in the first embodiment.
Figure 17B:
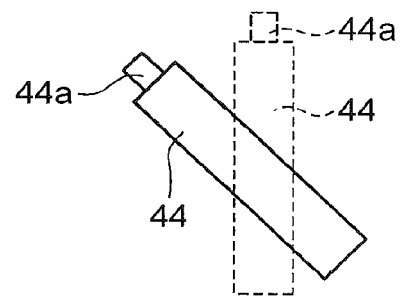
FIG. 17B is an explanatory diagram showing a fourth lens holding frame in this state.

When the above phenomenon occurs, as shown in FIG. 17A, as well as in the first embodiment or in the second embodiment (in FIG. 17A, the same arrangement as in the first embodiment is used), in the case where a second stopper pin 23 is provided at a front end of a fixed cylinder 2 and the distance between the second stopper pin 23 and each respective engaging members 42a to 44a in the optical axis direction is equal to the distance between a first stopper pin 22 and the each respective engaging members 42a to 44a in the optical axis direction, the distance between the second stopper pin 23 and the each respective engaging members 42a to 44a is successively increased in the optical axis direction, as the lens group is moved from the telephoto end toward the wide angle end. As a result, a positional displacement of cam grooves 31 to 33 with respect to guide grooves (centerline) in the fixed cylinder 2 increases, and as shown in FIG. 17B, an inclination of a lens holding frame 44 with respect to the plane orthogonal to the optical axis direction increases. The inclination of a lens holding frame with respect to the plane orthogonal to the optical axis direction is largest in the case where the length of a cam groove in engagement with the lens holding frame in the optical axis direction is longest among the cam grooves 31 to 33, in other words, the inclination is largest in a lens holding frame whose moving distance from the telephoto end (first position) to the wide angle end (second position) is largest in the optical axis direction. In the first embodiment to the third embodiment, the fourth lens holding frame (or the third lens holding frame) is a lens holding frame whose moving distance is largest, and the inclination of the fourth lens holding frame is largest.

In the third embodiment, the second stopper pin 323 is provided at the rear end of the fixed cylinder 302. As described above, the distance L4 (see FIG. 15B) between the second stopper pin 323 and the engaging member 344a (or the engaging member 342a or the engaging member 343a) in the optical axis direction is set shorter than the distance L3 between the first stopper pin 322 and the engaging member 344a (or the engaging member 342a or the engaging member 343a) in the optical axis direction at the wide angle end. Accordingly, as shown in FIG. 16A, even in the case where the cam ring 303 swings about the second stopper pin 323 (or the second rotation restricting portion 335) resulting from the fitting clearance 307 and the center axis of the cam ring 303 is inclined at the wide angle end, it is possible to suppress a positional displacement of the rear end of the third cam groove 333 in engagement with the engaging member 344a of the fourth lens holding frame 344 as a lens holding frame holding a lens group having a largest moving distance, with respect to the guide groove 321 (centerline) in the fixed cylinder 302, as compared with the case of the first embodiment. Further, as shown in FIG. 16B, it is also possible to suppress the inclination of the fourth lens holding frame 344 with respect to the plane orthogonal to the optical axis direction, as compared with the case of the first embodiment. Thus, the lens barrel 310 in the third embodiment is more advantageous in suppressing optical performance degradation.

Further, the distance L1 between the first stopper pin 322 and the engaging member 344a in the optical axis direction is set shorter than the distance L2 between the second stopper pin 323 and the engaging member 344a in the optical axis direction at the telephoto end. Accordingly, it is possible to suppress an inclination of the fourth lens holding frame 344 with respect to the plane orthogonal to the optical axis direction, as compared with e.g. the case where the first stopper pin 322 is provided at the rear end of the fixed cylinder 302. Thus, the lens barrel 310 in the third embodiment is more advantageous in suppressing optical performance degradation also in this aspect.

In the third embodiment, a lens holding frame holding a lens group having a largest moving distance and therefore whose optical performance is likely to be degraded resulting from an inclination of the center axis of the cam ring, is specifically selected as an object whose inclination should be suppressed, and the distance between the engaging member of the target lens holding frame holding the lens group having the largest moving distance and each respective stopper pin (the first stopper pin or the second stopper pin) is set to a short distance at each of the zoom ends. Alternatively, if there is a lens group whose moving distance is not largest between the zoom ends, but whose inclination should be suppressed, it is possible to set a distance between an engaging member of a lens holding frame holding such a lens group and each respective stopper pin to a short distance at each of the zoom ends. Further alternatively, even in the case where the lens holding frame holding a lens group whose inclination should be suppressed at the telephoto end is not the same as the lens holding frame holding a lens group whose inclination should be suppressed at the wide angle end, the above arrangement may be implemented.

Figure 18A:
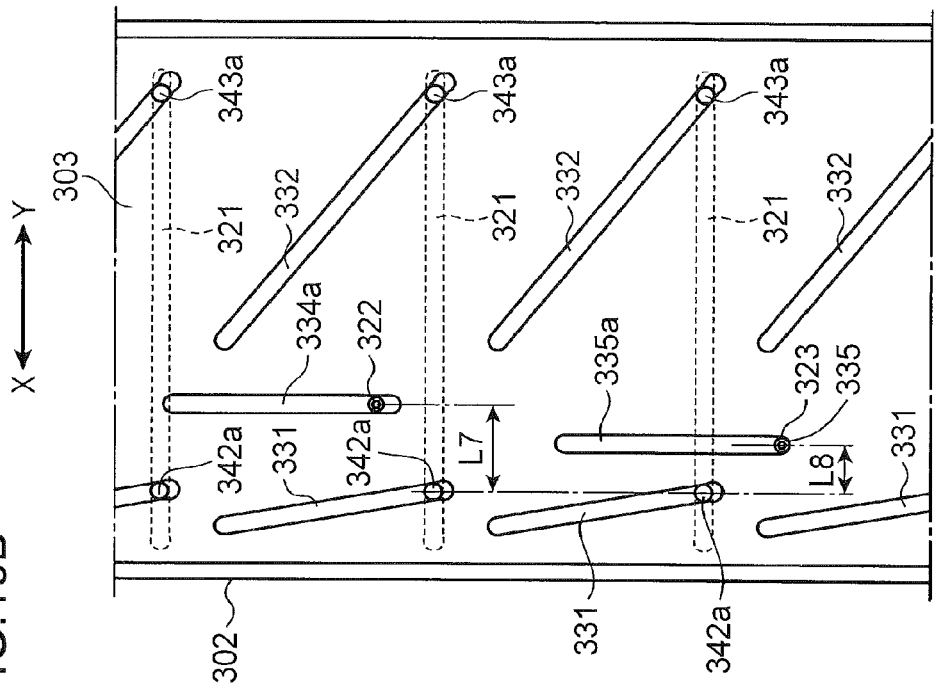
FIG. 18A is a developed view showing a state that the first stopper pin is abutted against the first rotation restricting portion as a modification of the third embodiment.
Figure 18B:
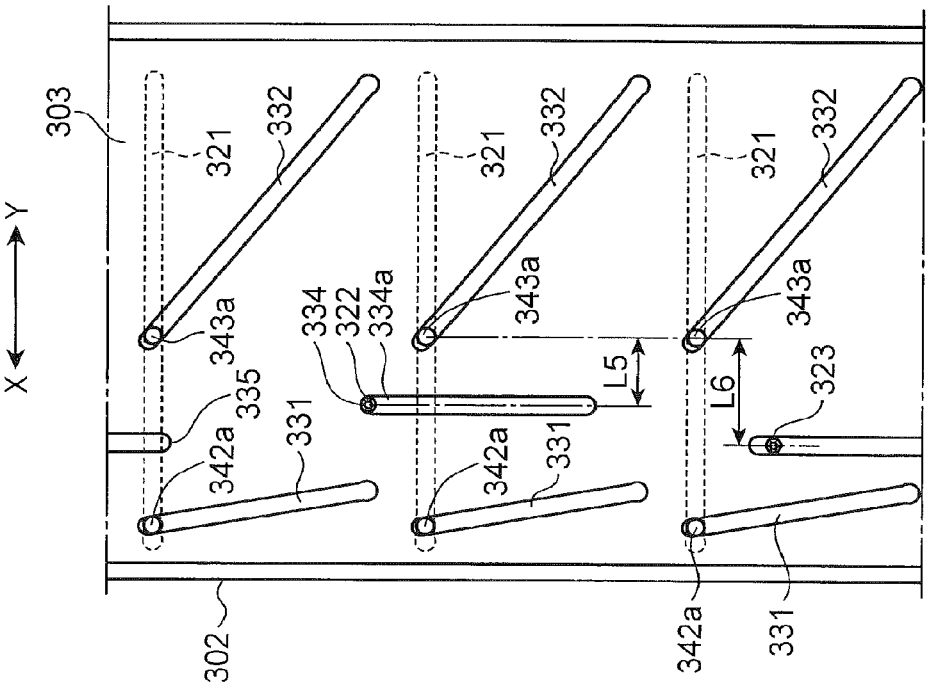
FIG. 18B is a developed view showing a state that the second stopper pin is abutted against the second rotation restricting portion as the modification of the third embodiment.

For instance, in the case where there are two movable lens groups, and two lens holding frames respectively holding the movable lens groups, and as shown in FIGS. 18A and 18B, in the case where there are formed two cam grooves i.e. a first cam groove 331 and a second cam groove 332, a lens barrel may be constructed in such a manner that a first stopper pin 322, a second stopper pin 323, a first recess portion 334a having a first rotation restricting portion 334 and a second recess portion 335a having a second rotation restricting portion 335 are disposed between the first cam groove 331 and the second cam groove 332 in the optical axis direction, and that a distance L5 between the first stopper pin 322 and an engaging member 343a in the optical axis direction is set shorter than a distance L6 between the second stopper pin 323 and the engaging member 343a in the optical axis direction for suppressing an inclination of a lens holding frame having the engaging member 343a engaged in the second cam groove 332 at the telephoto end shown in FIG. 18A. Further, the lens barrel may be constructed in such a manner that a distance L8 between the first stopper pin 322 and an engaging member 342a in the optical axis direction is set shorter than a distance L7 between the second stopper pin 323 and the engaging member 342a in the optical axis direction for suppressing an inclination of a lens holding frame having the engaging member 342a engaged in the first cam groove 331 at the wide angle end shown in FIG. 18B.

In the first to third embodiments, the cam ring is disposed on the outer circumference of the fixed cylinder. Alternatively, a cam ring may be disposed on the inner circumference of a fixed cylinder, as necessary.

In the first to third embodiments, the stopper pin as a projection is formed on the fixed cylinder, and the rotation restricting portion is formed on the cam ring. Alternatively, for instance, a rotation restricting portion may be formed on a fixed cylinder, and a stopper pin may be formed on a cam ring, as necessary.

In the first to third embodiments, the first stopper pin and the second stopper pin are disposed away from each other circumferentially by 180° with respect to the center angle. Alternatively, a first stopper pin and a second stopper pin may be disposed away from each other circumferentially by a certain distance, as necessary.

In the first to third embodiments, the lens groups are comprised of the first lens group serving as a focus mechanism portion, the second lens group serving as a zoom mechanism portion, the third lens group and the fourth lens group, and the fifth lens group as a fixed lens group. Alternatively, lens groups may be comprised of e.g. a second lens group serving as a zoom mechanism portion, a third lens group and a fourth lens group, as necessary.

In the first to third embodiments, the cam ring is engaged with three lens groups i.e. the second lens group, the third lens group and the fourth lens group as movable lens groups. Alternatively, a cam ring may be engaged with at least one or more lens groups. Further alternatively, a cam ring may be engaged with a first lens group serving as a focus mechanism portion, as necessary.

In the first to third embodiments, the projection lens is adapted for use in a projector. Alternatively, a projection lens may be implemented as a lens for use in a camera, as necessary.

In the first to third embodiments, there is used one image display element for a projector. Alternatively, plural (e.g. three) image display elements may be used, as necessary.

The specification discloses the aforementioned arrangements. The following is a summary of the primary arrangements of the embodiments.

A lens barrel according to an aspect includes a fixed cylinder, a lens holding frame which holds a lens, a cam ring mounted on the fixed cylinder in such a manner as to be engaged with the lens holding frame and to be rotatable about an optical axis, a first projection which is formed on one of the fixed cylinder and the cam ring, a first rotation restricting portion which is formed on the other of the fixed cylinder and the cam ring, a second projection which is formed on one of the fixed cylinder and the cam ring, and a second rotation restricting portion which is formed on the other of the fixed cylinder and the cam ring. The cam ring moves the lens holding frame in a direction of the optical axis as the cam ring is rotated about the optical axis. The first rotation restricting portion is contacted with the first projection when the cam ring is rotated in a first direction for restricting the rotation of the cam ring in the first direction, and the second rotation restricting portion is contacted with the second projection when the cam ring is rotated in a second direction opposite to the first direction for restricting the rotation of the cam ring in the second direction.

In the lens barrel thus constructed, it is possible to suppress a displacement in directions opposite to each other at one of zoom ends and the other of the zoom ends by the two projections and the two rotation restricting portions. This reduces a decentering amount at both zoom ends, as compared with a case where displacement suppression is performed by a single projection. Thus, the lens barrel having the above arrangement is advantageous in suppressing optical performance degradation.

According to another aspect, the lens barrel is constructed in such a manner that a force is exerted on the cam ring in a direction substantially identical to a direction of a gravitational force in at least one of a state that the first rotation restricting portion restricts the rotation of the cam ring by abutting contact with the first projection when the cam ring is rotated in the first direction, and a state that the second rotation restricting portion restricts the rotation of the cam ring by abutting contact with the second projection when the cam ring is rotated in the second direction.

In the lens barrel thus constructed, in the case where the posture of the lens barrel in use is pre-set, as in a projector, an initial displacement direction is the same as the direction in which the weight of the lens barrel is applied. Accordingly, it is possible to make the direction in which a force is exerted on the cam ring at a zoom end coincident with the direction of the gravitational force, thereby preventing the cam ring from being raised. The lens barrel thus constructed is advantageous in suppressing a change in the displacement of the cam ring with respect to the fixed cylinder at both zoom ends. This is further advantageous in suppressing optical performance degradation.

Preferably, in the lens barrel, the first rotation restricting portion and the second rotation restricting portion may be disposed at such positions that at least one of a line segment connecting between the first rotation restricting portion and the optical axis and a line segment connecting between the second rotation restricting portion and the optical axis lies in a range of ±30° with respect to a horizontal direction when the lens barrel is used in a state that the optical axis is aligned with the horizontal direction.

According to another aspect, in the lens barrel, the first projection and the second projection are disposed away from each other by a certain distance in the optical axis direction.

In the case where a displacement occurs resulting from a fitting clearance between the fixed cylinder and the cam ring at the zoom ends, the position of the cam groove formed in the cam ring may be displaced resulting from an inclination of the center axis of the cam ring with respect to the center axis of the fixed cylinder, and the lens holding frame engaged in the cam groove may be inclined with respect to the plane orthogonal to the optical axis direction. In the lens barrel thus constructed, it is possible to make the distance between the projection about which the cam ring swings and is inclined, and the engaging member of the lens holding frame holding the intended movable lens group, of which the inclination amount is to be reduced at each of the zoom ends, to a short distance. This reduces a positional displacement amount of the cam groove in engagement with the lens holding frame holding the intended movable lens group. The lens barrel thus constructed is advantageous in reducing a positional displacement of the cam groove formed in the cam ring, which is generated as the center axis of the cam ring is inclined, and in suppressing an inclination of the lens holding frame engaged in the cam groove with respect to the plane orthogonal to the optical axis direction.

According to another aspect, in the lens barrel thus constructed, the cam ring has a cam groove formed with a certain angle in an axis direction and in a circumferential direction, and the lens holding frame has an engaging member movable along the cam groove in engagement therein. Assuming that a position of the lens holding frame when the first projection is abutted against the first rotation restricting portion is a first position, and a position of the lens holding frame when the second projection is abutted against the second rotation restricting portion is a second position, the lens barrel is constructed in such a manner that a distance between the engaging member of the lens holding frame and the first projection in the optical axis direction is set shorter than a distance between the engaging member of the lens holding frame and the second projection in the optical axis direction when the lens holding frame is in the first position, and a distance between the engaging member of the lens holding frame and the second projection in the optical axis direction is set shorter than a distance between the engaging member of the lens holding frame and the first projection in the optical axis direction when the lens holding frame is in the second position.

In the case where a displacement occurs resulting from a fitting clearance between the fixed cylinder and the cam ring at each of the zoom ends as described above, the position of the cam groove formed in the cam ring may be displaced resulting from an inclination of the center axis of the cam ring with respect to the center axis of the fixed cylinder, and the lens holding frame engaged in the cam groove may be inclined with respect to the plane orthogonal to the optical axis direction. The lens barrel is constructed in such a manner that the distance between the engaging member of the lens holding frame and the first projection in the optical axis direction is set shorter than the distance between the engaging member of the lens holding frame and the second projection in the optical axis direction when the lens holding frame is in the first position, and the distance between the engaging member of the lens holding frame and the second projection in the optical axis direction is set shorter than the distance between the engaging member of the lens holding frame and the first projection in the optical axis direction when the lens holding frame is in the second position. With this arrangement, since the center axis of the cam ring is adjusted to be closer to the center axis of the fixed cylinder, it is possible to reduce a positional displacement amount of the cam groove at each of the zoom ends. In the lens barrel thus constructed, it is possible to suppress an inclination of the lens holding frame engaged in the cam groove resulting from a positional displacement of the cam groove formed in the cam ring due to an inclination of the center axis of the cam ring, with respect to the plane orthogonal to the optical axis direction. The inclination of the lens holding frame due to an inclination of the center axis of the cam ring tends to increase in the lens holding frame which has a largest moving distance and is engaged in the cam groove with a largest inclination angle with respect to the plan orthogonal to the optical axis direction. Accordingly, it is possible to effectively suppress optical performance degradation by designating a lens holding frame holding a lens group having a largest moving distance as the intended lens holding frame and by carrying out the above construction.

According to another aspect, in the lens barrel thus constructed, the cam ring has a cam groove formed with a certain angle in an axis direction and in a circumferential direction, and a plurality of the lens holding frames are provided, each of the lens holding frames having an engaging member movable along the cam groove in engagement therein. Assuming that a position of the lens holding frame when the first projection is abutted against the first rotation restricting portion is a first position, and a position of the lens holding frame when the second projection is abutted against the second rotation restricting portion is a second position, the lens barrel is constructed in such a manner that a distance between the engaging member of a specific one of the lens holding frames and the first projection in the optical axis direction is set shorter than a distance between the engaging member of the specific lens holding frame and the second projection in the optical axis direction when the lens holding frames are in the first position, and a distance between the engaging member of one of the lens holding frames other than the specific lens holding frame and the second projection in the optical axis direction is set shorter than a distance between the engaging member of the other lens holding frame and the first projection in the optical axis direction when the lens holding frames are in the second position.

In the case where a displacement occurs resulting from a fitting clearance between the fixed cylinder and the cam ring at the zoom ends as described above, the position of the cam groove formed in the cam ring may be displaced resulting from an inclination of the center axis of the cam ring with respect to the center axis of the fixed cylinder, and the lens holding frame engaged in the cam groove may be inclined with respect to the plane orthogonal to the optical axis direction. In the lens barrel thus constructed, even if the lens holding frame, of which the inclination amount is to be reduced, differs depending on the zoom end, it is possible to make the distance between the engaging member of the specific lens holding frame and the first projection (or the second projection) to a short distance at each of the zoom ends. This reduces a positional displacement amount of the cam groove in engagement with the lens holding frame holding a movable lens group at each of the zoom ends. Accordingly, the lens barrel thus constructed is advantageous in reducing a positional displacement of the cam groove formed in the cam ring, which is generated as the center axis of the cam ring is inclined, and in suppressing an inclination of the lens holding frame engaged in the cam groove with respect to the plane orthogonal to the optical axis direction.

According to another aspect, the lens barrel thus constructed further includes an actuator, and a drive gear coupled to the actuator, wherein the cam ring has a gear portion on an outer circumference thereof, and the gear portion is meshed with the drive gear to thereby transmit a driving force from the actuator to the cam ring for driving and rotating the cam ring.

In the case where the lens barrel is driven by an electric motor, a force exerted on the cam ring after the first projection is abutted against the first rotation restricting portion or after the second projection is abutted against the second rotation restricting portion is sustainable, as compared with the case where the lens barrel is manually operated, and therefore, optical performance degradation at a zoom end is likely to occur. In the lens barrel thus constructed, however, it is possible to reduce a decentering amount resulting from a displacement due to a fitting clearance at one of the zoom ends and the other of the zoom ends, as compared with the conventional example, in which decentering suppression is performed by a single projection. Thus, the above arrangement is suitable for an electric-motor-driven lens barrel.

According to yet another aspect, in the lens barrel thus constructed, the actuator further includes a motor, and a torque limiter mechanism for cutting off torque transmission when an overload is exerted on the cam ring.

In the case where the lens barrel is driven by an electric motor, a force exerted on the cam ring when the respective corresponding projections are abutted against the respective corresponding rotation restricting portions is large and sustainable, as compared with the case where the lens barrel is manually operated, and therefore, optical performance degradation at a zoom end is likely to occur. In the lens barrel thus constructed, however, with the provision of the torque limiter mechanism, it is possible to reduce a decentering amount resulting from a displacement due to a fitting clearance at one of the zoom ends and the other of the zoom ends, as compared with the conventional example in which decentering suppression is performed by a single projection. Thus, the arrangement is suitable for an electric-motor-driven lens barrel.

The projection lens according to yet another aspect includes one of the aforementioned lens barrels, and one or more lens groups housed in the inside of the lens barrel.

A projector according to still another aspect includes one of the aforementioned lens barrels, an image display element which modulates illumination light based on an image signal, a light source which emits the illumination light, and an illumination optical system which guides the illumination light to the image display element, wherein the lens barrel is provided with at least one lens group in the lens barrel.

The projection lens and the projector thus constructed are provided with one of the aforementioned lens barrels. Accordingly, with the provision of the two projections and the two rotation restricting portions, it is possible to prevent a displacement in directions opposite to each other at one of the zoom ends and the other of the zoom ends, and it is possible to reduce a decentering amount between the zoom ends, as compared with the conventional example. Thus, the projection lens and the projector thus constructed are advantageous in suppressing optical performance degradation.

This application is based on Japanese Patent Application No. 2011-129989 filed on Jun. 10, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A lens barrel, comprising:
a fixed cylinder;
a lens holding frame which holds a lens;
a cam ring mounted on the fixed cylinder in such a manner as to be engaged with the lens holding frame and to be rotatable about an optical axis, the cam ring comprising a cam groove;
a first projection which is formed on one of the fixed cylinder and the cam ring;
a first rotation restricting portion which is formed on the other of the fixed cylinder and the cam ring;
a second projection which is formed on one of the fixed cylinder and the cam ring; and
a second rotation restricting portion which is formed on the other of the fixed cylinder and the cam ring, wherein
the lens holding frame has an engaging member movable along the cam groove in engagement therein;
the cam ring moves the lens holding frame in a direction of the optical axis as the cam ring is rotated about the optical axis,
the first rotation restricting portion is contacted with the first projection when the cam ring is rotated in a first direction for restricting the rotation of the cam ring in the first direction, and
the second rotation restricting portion is contacted with the second projection when the cam ring is rotated in a second direction opposite to the first direction for restricting the rotation of the cam ring in the second direction.

2. The lens barrel according to claim 1, wherein
the lens barrel is constructed in such a manner that a force is exerted on the cam ring in a direction substantially identical to a direction of a gravitational force in at least one of a state that the first rotation restricting portion restricts the rotation of the cam ring by abutting contact with the first projection when the cam ring is rotated in the first direction, and a state that the second rotation restricting portion restricts the rotation of the cam ring by abutting contact with the second projection when the cam ring is rotated in the second direction.

3. The lens barrel according to claim 1, wherein
the first rotation restricting portion and the second rotation restricting portion are disposed at such positions that at least one of a line segment connecting between the first rotation restricting portion and the optical axis and a line segment connecting between the second rotation restricting portion and the optical axis lies in a range of ±30° with respect to a horizontal direction when the lens barrel is used in a state that the optical axis is aligned with the horizontal direction.

4. The lens barrel according to claim 1, wherein
the first projection and the second projection are disposed away from each other by a certain distance in the optical axis direction.

5. The lens barrel according to claim 2, wherein
the first projection and the second projection are disposed away from each other by a certain distance in the optical axis direction.

6. The lens barrel according to claim 4, wherein
the cam groove is formed with a certain angle in an axis direction and in a circumferential direction,
assuming that a position of the lens holding frame when the first projection is abutted against the first rotation restricting portion is a first position, and a position of the lens holding frame when the second projection is abutted against the second rotation restricting portion is a second position,
the lens barrel is constructed in such a manner that
a distance between the engaging member of a specific one of the lens holding frame and the first projection in the optical axis direction is set shorter than a distance between the engaging member of the lens holding frame and the second projection in the optical axis direction when the lens holding frame is in the first position, and
a distance between the engaging member of one of the lens holding frame and the second projection in the optical axis direction is set shorter than a distance between the engaging member of the lens holding frame and the first projection in the optical axis direction when the lens holding frame is in the second position.

7. The lens barrel according to claim 5, wherein
the cam groove is formed with a certain angle in an axis direction and in a circumferential direction, and
assuming that a position of the lens holding frame when the first projection is abutted against the first rotation restricting portion is a first position, and a position of the lens holding frame when the second projection is abutted against the second rotation restricting portion is a second position,
the lens barrel is constructed in such a manner that
a distance between the engaging member of the lens holding frame and the first projection in the optical axis direction is set shorter than a distance between the engaging member of the lens holding frame and the second projection in the optical axis direction when the lens holding frame is in the first position, and a distance between the engaging member of the lens holding frame and the second projection in the optical axis direction is set shorter than a distance between the engaging member of the lens holding frame and the first projection in the optical axis direction when the lens holding frame is in the second position.

8. The lens barrel according to claim 4, wherein
the cam ring comprises a plurality of cam grooves, each formed with a certain angle in an axis direction and in a circumferential direction,
a plurality of the lens holding frames are provided, each of the lens holding frames having an engaging member movable along one of the cam grooves in engagement therein, and
assuming that a position of the lens holding frame when the first projection is abutted against the first rotation restricting portion is a first position, and a position of the lens holding frame when the second projection is abutted against the second rotation restricting portion is a second position,
the lens barrel is constructed in such a manner that
a distance between the engaging member of a specific one of the lens holding frames and the first projection in the optical axis direction is set shorter than a distance between the engaging member of the specific lens holding frame and the second projection in the optical axis direction when the lens holding frames are in the first position, and
a distance between the engaging member of one of the lens holding frames other than the specific lens holding frame and the second projection in the optical axis direction is set shorter than a distance between the engaging member of the other lens holding frame and the first projection in the optical axis direction when the lens holding frames are in the second position.

9. The lens barrel according to claim 5, wherein
the cam ring comprises a plurality of cam grooves, each formed with a certain angle in an axis direction and in a circumferential direction,
a plurality of the lens holding frames are provided, each of the lens holding frames having an engaging member movable along one of the cam grooves in engagement therein, and
assuming that a position of the lens holding frame when the first projection is abutted against the first rotation restricting portion is a first position, and a position of the lens holding frame when the second projection is abutted against the second rotation restricting portion is a second position,
the lens barrel is constructed in such a manner that
a distance between the engaging member of a specific one of the lens holding frames and the first projection in the optical axis direction is set shorter than a distance between the engaging member of the specific lens holding frame and the second projection in the optical axis direction when the lens holding frames are in the first position, and
a distance between the engaging member of one of the lens holding frames other than the specific lens holding frame and the second projection in the optical axis direction is set shorter than a distance between the engaging member of the other lens holding frame and the first projection in the optical axis direction when the lens holding frames are in the second position.

10. The lens barrel according to claim 1, further comprising:
an actuator, and a drive gear coupled to the actuator, wherein
the cam ring has a gear portion on an outer circumference thereof, and
the gear portion is meshed with the drive gear to thereby transmit a driving force from the actuator to the cam ring for driving and rotating the cam ring.

11. The lens barrel according to claim 10, wherein
the actuator further includes a motor, and a torque limiter mechanism for cutting off torque transmission when an overload is exerted on the cam ring.

12. A projector comprising:
the lens barrel of claim 1;
an image display element which modulates illumination light based on an image signal;
a light source which emits the illumination light; and
an illumination optical system which guides the illumination light to the image display element, wherein
the lens barrel is provided with at least one lens group in the lens barrel.

13. The projector according to claim 12, wherein
the lens barrel is constructed in such a manner that a force is exerted on the cam ring in a direction substantially identical to a direction of a gravitational force in at least one of a state that the first rotation restricting portion restricts the rotation of the cam ring by abutting contact with the first projection when the cam ring is rotated in the first direction, and a state that the second rotation restricting portion restricts the rotation of the cam ring by abutting contact with the second projection when the cam ring is rotated in the second direction.

14. The projector according to claim 12, wherein
the lens barrel is loaded in the projector in such a manner that the optical axis is aligned with a horizontal direction, and
the first rotation restricting portion and the second rotation restricting portion are disposed at such positions that at least one of a line segment connecting between the first rotation restricting portion and the optical axis and a line segment connecting between the second rotation restricting portion and the optical axis lies in a range of ±30° with respect to the horizontal direction.

15. The projector according to claim 12, wherein
the first projection and the second projection are disposed away from each other by a certain distance in the optical axis direction.

16. The projector according to claim 13, wherein
the first projection and the second projection are disposed away from each other by a certain distance in the optical axis direction.

17. The projector according to claim 14, wherein
the first projection and the second projection are disposed away from each other by a certain distance in the optical axis direction.

18. The projector according to claim 17, wherein
the cam ring has a cam groove formed with a certain angle in an axis direction and in a circumferential direction,
the lens holding frame has an engaging member movable along the cam groove in engagement therein, and
assuming that a position of the lens holding frame when the first projection is abutted against the first rotation restricting portion is a first position, and a position of the lens holding frame when the second projection is abutted against the second rotation restricting portion is a second position, the lens barrel is constructed in such a manner that a distance between the engaging member of the lens holding frame and the first projection in the optical axis direction is set shorter than a distance between the engaging member of the lens holding frame and the second projection in the optical axis direction when the lens holding frame is in the first position, and a distance between the engaging member of the lens holding frame and the second projection in the optical axis direction is set shorter than a distance between the engaging member of the lens holding frame and the first projection in the optical axis direction when the lens holding frame is in the second position.

19. The projector according to claim 18, wherein the lens holding frame holds a lens group whose moving amount in the optical axis direction is largest among the lens groups.

20. The projector according to claim 17, wherein the cam ring comprises a plurality of cam grooves, each formed with a certain angle in an axis direction and in a circumferential direction, a plurality of the lens holding frames are provided, each of the lens holding frames having an engaging member movable along one of the cam grooves in engagement therein, and assuming that a position of the lens holding frame when the first projection is abutted against the first rotation restricting portion is a first position, and a position of the lens holding frame when the second projection is abutted against the second rotation restricting portion is a second position, the lens barrel is constructed in such a manner that a distance between the engaging member of a specific one of the lens holding frames and the first projection in the optical axis direction is set shorter than a distance between the engaging member of the specific lens holding frame and the second projection in the optical axis direction when the lens holding frames are in the first position, and a distance between the engaging member of one of the lens holding frames other than the specific lens holding frame and the second projection in the optical axis direction is set shorter than a distance between the engaging member of the other lens holding frame and the first projection in the optical axis direction when the lens holding frames are in the second position.

21. The projector according to claim 20, wherein the lens holding frame holds a lens group whose moving amount in the optical axis direction is largest among the lens groups.

* * * * *